US007760188B2

(12) United States Patent
Yoshio et al.

(10) Patent No.: US 7,760,188 B2

(45) Date of Patent: Jul. 20, 2010

(54) INFORMATION PROCESSING SYSTEM, REMOTE MANEUVERING UNIT AND METHOD THEREOF, CONTROL UNIT AND METHOD THEREOF, PROGRAM, AND RECORDING MEDIUM

(75) Inventors: Taichi Yoshio, Kanagawa (JP); Satoru Higashiyama, Chiba (JP); Hirokazu Hashimoto, Kanagawa (JP); Toshiyuki Takahashi, Tokyo (JP)

(73) Assignee: Sony Corporation, Tokyo (JP)

( * ) Notice: Subject to any disclaimer, the term of this patent is extended or adjusted under 35 U.S.C. 154(b) by 999 days.

(21) Appl. No.: 11/002,983

(22) Filed: Dec. 2, 2004

(65) Prior Publication Data

US 2005/0143870 A1 Jun. 30, 2005

(30) Foreign Application Priority Data

Dec. 3, 2003 (JP) ............................ 2003-404436

(51) Int. Cl.
*G06F 3/041* (2006.01)

(52) U.S. Cl. ....................................... 345/173; 345/169

(58) Field of Classification Search ................. 345/173, 345/156, 158, 169, 7, 167; 348/734; 455/556.2; 74/473.31, 473.32, 473.18; 200/61.54
See application file for complete search history.

(56) References Cited

U.S. PATENT DOCUMENTS

| | | | | |
|---|---|---|---|---|
| 6,009,355 | A * | 12/1999 | Obradovich et al. | 345/7 |
| 6,053,066 | A * | 4/2000 | Ishii et al. | 74/473.18 |
| 6,661,406 | B1 * | 12/2003 | Enoki | 345/173 |
| 6,701,161 | B1 * | 3/2004 | Wendling | 455/556.2 |
| 6,798,429 | B2 * | 9/2004 | Bradski | 345/156 |
| 7,084,859 | B1 * | 8/2006 | Pryor | 345/156 |
| 7,126,583 | B1 * | 10/2006 | Breed | 345/158 |

FOREIGN PATENT DOCUMENTS

| | | |
|---|---|---|
| EP | 1 146 739 A2 | 10/2001 |
| EP | 1 082 671 B1 | 3/2008 |
| JP | 60-243730 | 12/1985 |
| JP | 63-172325 | 7/1988 |
| JP | 05-227578 | 9/1993 |
| JP | 11-105646 | 4/1999 |
| JP | 2000-347271 | 6/1999 |
| JP | 2000-354283 | 12/2000 |

OTHER PUBLICATIONS

Office Action Dated Dec. 8, 2009 from Japanese application No. 63-172325.

* cited by examiner

*Primary Examiner*—Chanh Nguyen
*Assistant Examiner*—Adam J Snyder
(74) *Attorney, Agent, or Firm*—Wolf, Greenfield & Sacks, P.C.

(57) ABSTRACT

A remote controller has a touch panel. Multiple items are shown on a display. A user draws a line on the touch panel in the direction where the item is desired to select by moving the finger, for example. The remote controller determines the direction of the drawn line, and transmits the signal indicating the direction to a control unit. The control unit determines the item disposed in the direction indicated by the signal, and executes a process associated with that determined item. The process is executed in this manner, and thus an instruction is made to given devices. The invention can be applied to a car navigation system.

8 Claims, 20 Drawing Sheets

INFORMATION PROCESSING SYSTEM, REMOTE MANEUVERING UNIT AND METHOD THEREOF, CONTROL UNIT AND METHOD THEREOF, PROGRAM, AND RECORDING MEDIUM

FIELD OF THE INVENTION

The present invention relates to an information processing system, a remote maneuvering unit and a method thereof, a control unit and a method thereof, a program, and a recording medium, particularly to an information processing system, a remote maneuvering unit and a method thereof, a control unit and a method thereof, a program, and a recording medium, which improve the operational ease of a remote controller and enhance the use of a singe remote controller.

BACKGROUND OF THE INVENTION

For electronic devices equipped inside a vehicle, there are an audio system called a car audio unit and a device that guides directions called a car navigation system. In recent years, the car audio unit and the car navigation system are being formed to have multiple functions. For example, the car navigation systems sometimes have functions to provide television broadcasting for users and to provide information for users by connecting the Internet, in addition to the traditional function to guide directions.

A multifunction car navigation system requires its remote controller to operate that car navigation system with multiple buttons for implementing its multiple functions. For example, in order to arrange buttons corresponding to the individual functions on a remote controller, it is considered to reduce the buttons in size. Reducing buttons in size allows many buttons to be arranged on the remote controller, and consequently a user can execute a single process by operating a single button.

However, it is troublesome for the user to search a desired button among many small buttons. Furthermore, the user needs to surely operate (press down) the searched button, which tends to cause the user to operate wrong, taking account of small buttons arranged in a small area.

The car navigation system is equipped in a vehicle, and it can be considered that a user sometimes operates a controller while driving. However, when the individual buttons on a control panel are small, a problem arises that the buttons are difficult to see and to operate, as similar to the case described above.

When the individual buttons on the control panel are formed greater, a user can see the control panel while driving during the limited time period such as waiting for the traffic light, during which the user can pay attention other than driving. Similarly, also when functions are configured to be selected hierarchically, a user can select a desired function while driving during the limited time period such as waiting for the traffic light.

However, a problem arises that it is difficult for the user to see the control panel and do desired operations at desired timing while driving. It is an object to provide a system by which users can easily instruct desired operations under any conditions in addition to while driving.

The invention has been made in view of the conditions. An object is to improve operational ease done by a remote controller. Furthermore, an object is to allow the user to execute a desired operation while the user does not need to pay attention on that operation under special circumstances such as while driving.

SUMMARY OF THE INVENTION

An aspect of a first information processing system according to the invention is an information processing system at least including:

an information processing unit;

a remote maneuvering unit for instructing the information processing unit; and a control unit for transmitting an instruction from the remote maneuvering unit to the information processing unit, wherein the remote maneuvering unit includes:

a sensing module for sensing a location touched by a user;

a determining module for determining a figure formed by sequentially connecting the locations sensed by the sensing module; and a transmitting module for transmitting a determined result by the determining module to the control unit, the control unit includes:

a receiving module for receiving the determined result transmitted by the transmitting module; and an outputting module for determining a process associated with the determined result received by the receiving module and outputting data indicating the process to the information processing unit, and the information processing unit includes:

an executing module for inputting the data outputted by the outputting module and executing the process indicated by the data.

An aspect of a second information processing system according to the invention is an information processing system at least including:

an information processing unit; and a remote maneuvering unit for instructing the information processing unit, wherein the remote maneuvering unit includes:

a sensing module for sensing a location touched by a user;

a first determining module for determining a figure formed by sequentially connecting the locations sensed by the sensing module; and a transmitting module for transmitting a determined result by the first determining module to the information processing unit, and the information processing unit includes:

a receiving module for receiving the determined result transmitted by the transmitting module;

a second determining module for determining a process associated with the determined result received by the receiving module; and an executing module for executing the process determined by the second determining module.

An aspect of a third information processing system according to the invention is an information processing system at least including:

an information processing unit; and a remote maneuvering unit for instructing the information processing unit, wherein the remote maneuvering unit includes:

a sensing module for sensing a location touched by a user;

a determining module for determining a figure formed by sequentially connecting the locations sensed by the sensing module; and a transmitting module for further determining a corresponding process from a determined result by the determining module, and creating and transmitting a signal indicating the process, and the information processing unit includes:

a receiving module for receiving the signal transmitted by the transmitting module; and an executing module for executing the process indicated by the signal received by the receiving module.

A first aspect of a remote maneuvering unit according to the invention is a remote maneuvering unit including:

a sensing module for sensing a location touched by a user;

a determining module for determining a figure formed by sequentially connecting the locations sensed by the sensing module; and a transmitting module for transmitting a determined result by the determining module.

In addition to the first aspect, a second aspect is in which when the determining module determines that the figure is a line, it further determines a direction of the line and the direction results in a determined result.

In addition to the second aspect, a third aspect is further including:

a detecting module mounted on a rotating member for detecting an angle at which the member rotates; and a correcting module for correcting a direction determined by the determining module in accordance with the angle detected by the detecting module.

In addition to the first aspect, a fourth aspect is in which the determining module determines the figure, and then further determines a process associated with the figure, and the process result in a determined result.

An aspect of a remote maneuvering method according to the invention is a remote maneuvering method for a remote maneuvering unit having a sensing module for sensing a location touched by a user, a processing module for processing the location sensed by the sensing module, and a transmitting module for transmitting a processed result by the processing module, the remote maneuvering method including:

a sensing step of sensing a location touched by a user;

a determining step of determining a figure formed by sequentially connecting the locations sensed at the process of the sensing step; and a transmitting step of transmitting a determined result at the process of the determining step by a transmitting module.

An aspect of a first program according to the invention is a program allowing a computer to execute a process, wherein the computer controls a remote maneuvering unit having a sensing module for sensing a location touched by a user, a processing module for processing the location sensed by the sensing module, and a transmitting module for transmitting a processed result by the processing module, the process including:

a sensing step of sensing a location touched by a user;

a determining step of determining a figure formed by sequentially connecting the locations sensed at the process of the sensing step; and a transmitting step of transmitting a determined result at the process of the determining step by a transmitting module.

An aspect of a first recording medium according to the invention is a recording medium recorded with a program readable by a computer for controlling a remote maneuvering unit having a sensing module for sensing a location touched by a user, a processing module for processing the location sensed by the sensing module, and a transmitting module for transmitting the processed result by the processing module, the recording medium including:

a sensing step of sensing a location touched by a user;

a determining step of determining a figure formed by sequentially connecting the locations sensed at the process of the sensing step; and a transmitting step of transmitting a determined result at the process of the determining step by a transmitting module.

A first aspect of a control unit according to the invention is a control unit for controlling sending and receiving data between an information processing unit and a remote maneuvering unit for instructing the information processing unit, the control unit including:

a receiving module for receiving information about a figure drawn by a user from the remote maneuvering unit;

a determining module for determining a figure represented by the information received by the receiving module;

an outputting module for determining data indicating a process associated with the figure determined by the determining module and outputting the data to the information processing unit.

In addition to the first aspect, a second aspect is in which when the determining module determines that the figure is a line, it further determines a direction of the line and the direction results in a determined result.

In addition to the first aspect, a third aspect is further including an acquiring module for acquiring data associated with data indicating the figure and the process from the information processing unit.

An aspect of a control method according to the invention is a control method of a control unit for controlling sending and receiving data between an information processing unit and a remote maneuvering unit for instructing the information processing unit, the control method including:

an input controlling step of controlling input of information from the remote maneuvering unit, the information received by a receiving module for receiving information about a figure drawn by a user;

a determining step of determining a figure represented by the information, input of the information controlled at the process of the input controlling step; and an output controlling step of determining data indicating a process associated with the figure determined at the process of the determining step and controlling output of the data to the information processing unit.

An aspect of a second program according to the invention is a program allowing a computer to execute a process, wherein the computer controls a control unit for controlling sending and receiving data between an information processing unit and a remote maneuvering unit for instructing the information processing unit, the process including:

an input controlling step of controlling input of information from the remote maneuvering unit, the information received by a receiving module for receiving information about a figure drawn by a user;

a determining step of determining a figure represented by the information, input of the information controlled at the process of the input controlling step; and an output controlling step of determining data indicating a process associated with the figure determined at the process of the determining step and controlling output of the data to the information processing unit.

An aspect of a second recording medium according to the invention is a recording medium recorded with a program readable by a computer for controlling a control unit for controlling sending and receiving data between an information processing unit and a remote maneuvering unit for instructing the information processing unit, the recording medium including:

- an input controlling step of controlling input of information from the remote maneuvering unit, the information received by a receiving module for receiving information about a figure drawn by a user;
- a determining step of determining a figure represented by the information, input of the information controlled at the process of the input controlling step; and
- an output controlling step of determining data indicating a process associated with the figure determined at the process of the determining step and controlling output of the data to the information processing unit.

The remote maneuvering unit in the first information processing system according to the invention determines a figure formed by sequentially connecting the locations touched by a user, and sends the determined result to the control unit. The control unit determines the process associated with the determined result from the remote maneuvering unit, and outputs data indicating the process to the information processing unit. The information processing unit inputs data from the control unit, and executes the process indicated by the data.

The remote maneuvering unit in the second information processing system according to the invention determines a figure formed by sequentially connecting the locations touched by a user, and sends the determined result to the information processing unit. The information processing unit determines the process associated with the determined result from the remote maneuvering unit, and executes the process being the determined result.

The remote maneuvering unit in the third information processing system according to the invention determines a figure formed by sequentially connecting the locations touched by a user, further determines the process corresponding to that figure, and creates and sends a signal indicating the process. The information processing unit executes the process indicated by the signal from the remote maneuvering unit.

In the remote maneuvering unit and the method thereof, and the first program according to the invention, the location touched by a user is sensed, the figure to be formed is determined by sequentially connecting the sensed locations, and the determined result is sent.

In the control unit and the method thereof, and the second program according to the invention, information about a figure drawn by a user is received from the remote maneuvering unit, the figure indicated by the received information is determined, data indicating the process associated with the figure is determined, and the data is outputted to the information processing unit.

According to the invention, an instruction can be made to desired devices to execute a given process by convenient operations, such as simply drawing a line.

According to the invention, when instructing given operations to desired devices, a user simply inputs a figure that can be drawn conveniently such as spots and lines. Therefore, for example, the user can easily make an instruction even while driving. Furthermore, it is fine that the remote maneuvering unit for instruction itself has the size to which spots and lines can be inputted. The size of the device itself can be reduced more than that of a remote maneuvering unit with multiple buttons.

According to the invention, an instruction is made by inputting a figure, and thus even the same operations can execute different processes when targets are different. Therefore, a single remote maneuvering unit can make instructions to various devices, and the range for use can be enhanced.

BRIEF DESCRIPTION OF THE DRAWINGS

The teachings of the invention can be readily understood by considering the following detailed description in conjunction with the accompanying drawings, in which.

DESCRIPTION OF THE INVENTION

Hereinafter, a best mode of the invention will be described, and the correspondence between the invention to be disclosed and embodiments is exemplified as follows. Even though there are embodiments that are described in the specification but not described here as they correspond to an invention, this does not mean that the embodiments do not correspond to that invention. Inversely, even though embodiments are described here as they correspond to an invention, this does not mean that those embodiments do not correspond to the invention other than that invention.

Furthermore, this description does not mean the entire invention described in the specification. In other words, this description is the invention described in the specification, which will afford to accept the invention that is not claimed in this application, namely, the invention that will be filed by divisional applications, and appeared and added by amendment in future.

The basic configuration of a first information processing system according to the invention at least includes an information processing unit (for example, a main body 12 in FIG. 2), a remote maneuvering unit (for example, a remote controller 21 in FIG. 6) which instructs the information processing unit, and a control unit (for example, a control unit 14 in FIG. 4) which transmits the instruction by the remote maneuvering unit to the information processing unit.

Figure 6:
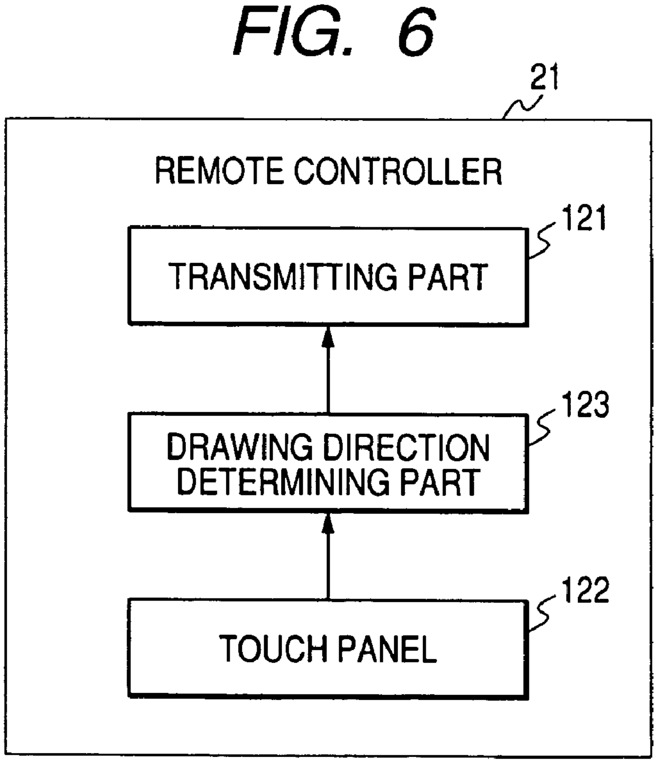
FIG. 6 is a diagram illustrating an exemplary internal configuration of the remote controller.

In the first information processing system, the remote maneuvering unit has a sensing module for sensing a location touched by a user (for example, a touch panel 122 in FIG. 6), a determining module for determining a figure formed by sequentially connecting the locations sensed by the sensing module (for example, a drawing direction determining part 123 in FIG. 6), and a transmitting module for transmitting the determined result by the determining module to the control unit (for example, a transmitting part 121 in FIG. 6). The control unit includes a receiving module for receiving the determined result transmitted by the transmitting module (for example, a receiving part 101 in FIG. 4), and an outputting module (for example, an interface 105 in FIG. 4) for determining a process associated with the determined result received by the receiving module (for example, done by a determining part 102, a location identifying part 103, and a control part 104 in FIG. 4) and outputting data indicating the process to the information processing unit. The information processing unit at least includes an executing module for inputting data outputted by the outputting module and executing the process indicated by the data (for example, a control part 51 in FIG. 2).

The basic configuration of a second information processing system to which the invention is applied at least includes an information processing unit (for example, a main body 12 in FIG. 22), and a remote maneuvering unit for instructing the information processing unit (for example, the remote controller 21 in FIG. 6).

In the second information processing system, the remote maneuvering unit includes a sensing module for sensing a location touched by a user (for example, the touch panel 122 in FIG. 6), a first determining module for determining a figure formed by sequentially connecting the locations sensed by the sensing module (for example, the drawing direction determining part 123 in FIG. 6), and a transmitting module for transmitting a determined result by the first determining module to the information processing unit (for example, the transmitting part 121 in FIG. 6). The information processing unit at least includes a receiving module for receiving the determined result transmitted by the transmitting module (for example, a receiving part 101 in FIG. 22), and a second determining module for determining a process associated with the determined result received by the receiving module (for example, a determining part 102, a location identifying part 103, and a control part 51 in FIG. 22), and an executing module for executing the process determined by the second determining module (for example, a control part 51 in FIG. 22).

Figure 23:
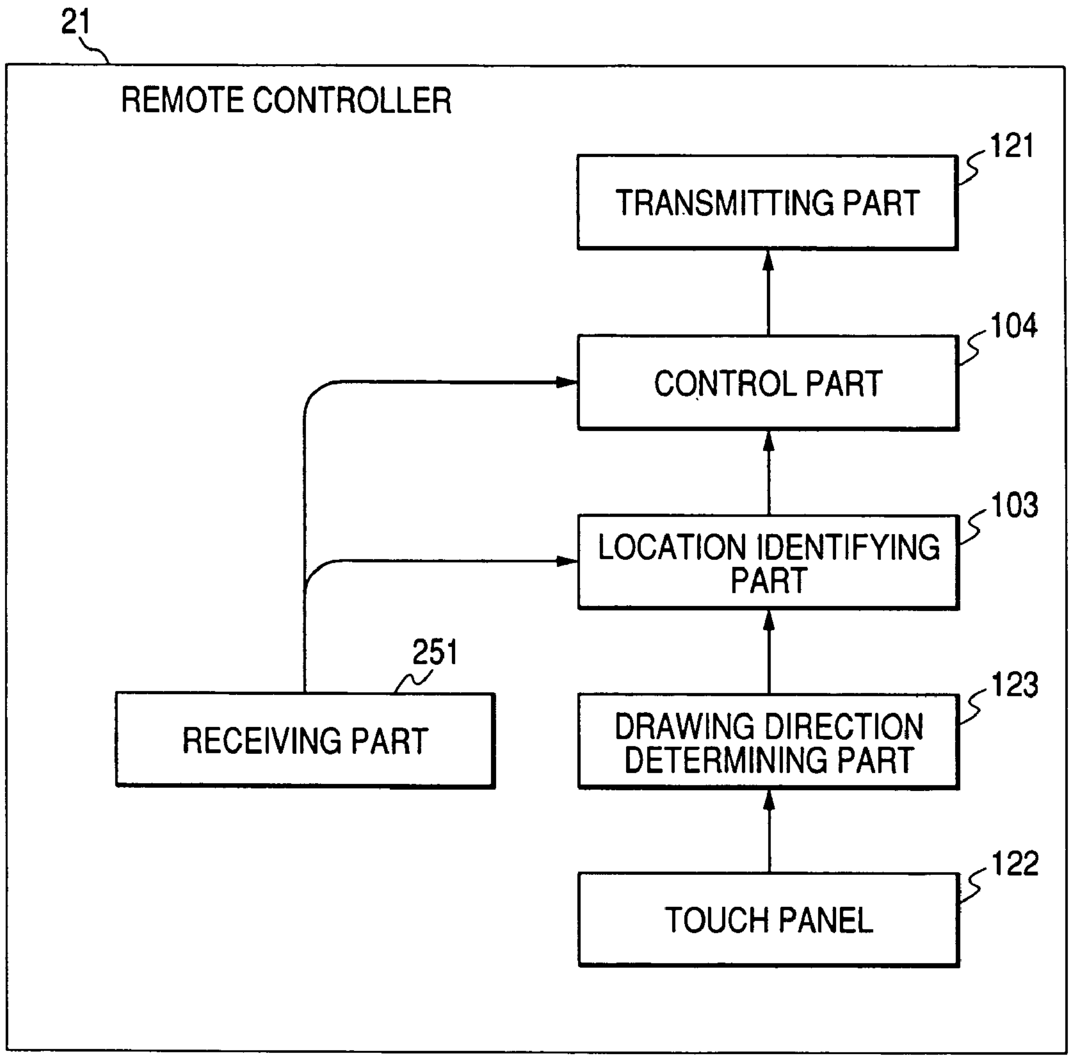
FIG. 23 is a diagram illustrating another exemplary configuration of a remote controller.

The basic configuration of a third information processing system to which the invention is applied at least includes an information processing unit (for example, a main body 12 in FIG. 2), and a remote maneuvering unit for instructing the information processing unit (for example, a remote controller 21 in FIG. 23).

In the third information processing system, the remote maneuvering unit includes a sensing module for sensing a location touched by a user (for example, a touch panel 122 in FIG. 23), a determining module for determining a figure formed by sequentially connecting the locations sensed by the sensing module (for example, a drawing direction determining part 123 in FIG. 23), and a transmitting module (for example, a transmitting part 121 in FIG. 23) for further determining a corresponding process from a determined result by the determining module and creating a signal indicating the process (for example, done by a location identifying part 103, and a control part 104 in FIG. 23) for transmission. The information processing unit at least includes a receiving module for receiving the signal transmitted by the transmitting module (for example, an input/output part 52 in FIG. 2), and an executing module for executing the process indicated by the signal received by the receiving module (for example, the control part 51 in FIG. 2).

According to the invention, a remote maneuvering unit is provided. This remote maneuvering unit is the remote controller 21 shown in FIG. 6, for example, which at least includes a sensing module for sensing a location touched by a user (for example, the touch panel 122 in FIG. 6), a determining module for determining a figure formed by sequentially connecting the locations sensed by the sensing module (for example, the drawing direction determining part 123 in FIG. 6), and a transmitting module for transmitting a determined result by the determining module (for example, the transmitting part 121 in FIG. 6).

Figure 21:
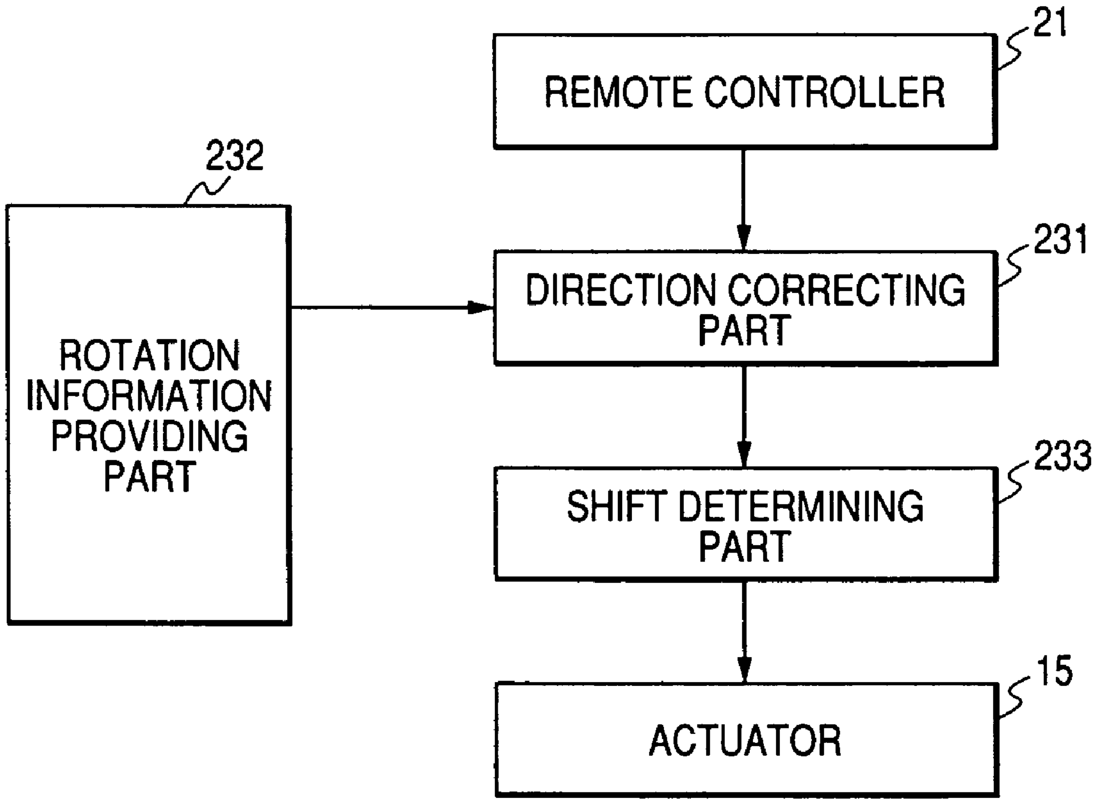
FIG. 21 is a diagram illustrating the configuration required for operating an actuator.

The remote maneuvering unit can further include a detecting module mounted on a rotating member (for example, a steering wheel 31 in FIG. 1) for detecting an angle at which the member rotates (for example, a rotation information providing part 232 in FIG. 21), and a correcting module for correcting a direction determined by the determining module in accordance with the angle detected by the detecting module (for example, a direction correcting part 231 in FIG. 21).

Furthermore, according to the invention, a remote maneuvering method is provided. This remote maneuvering method at least includes a sensing step of sensing a location touched by a user (for example, step S102 in FIG. 10), a determining step of determining a figure formed by sequentially connecting the locations sensed at the process of the sensing step (for example, step S103 in FIG. 10), and a transmitting step of transmitting a determined result at the process of the determining step by a transmitting module (for example, step S104 in FIG. 10).

Moreover, according to the invention, a first program is provided. This first program at least includes a sensing step of sensing a location touched by a user (for example, step S102 in FIG. 10), a determining step of determining a figure formed by sequentially connecting the locations sensed at the process of the sensing step (for example, step S103 in FIG. 10), and a transmitting step of transmitting a determined result at the process of the determining step by a transmitting module (for example, step S104 in FIG. 10).

The first program can be recorded in a first recording medium.

According to the invention, a control unit is provided. This control unit is the control unit 14 shown in FIG. 4, for example, which at least includes a receiving module for receiving information about a figure drawn by a user from the remote maneuvering unit (for example, the receiving part 101 in FIG. 4), a determining module for determining the figure represented by the information received by the receiving module (for example, the determining part 102 in FIG. 4), and an outputting module for determining data indicating the process associated with the figure determined by the determining module and outputting the data to an information processing unit (for example, the interface 105 in FIG. 4).

In addition, according to the invention, a control method is provided. This control method at least includes an input controlling step of controlling input of information from the remote maneuvering unit, the information is received by a receiving module for receiving information about a figure drawn by a user (for example, step S122 in FIG. 15), a determining step of determining a figure represented by the information, input of the information is controlled at the process of the input controlling step (for example, step S123 in FIG. 15), and an output controlling step of determining data indicating the process associated with the figure determined at the process of the determining step (for example, step S124 in FIG. 15) and controlling output of the data to information processing unit (for example, step S125 in FIG. 15).

Furthermore, according to the invention, a second program is provided. This second program at least includes an input controlling step of controlling input of information from the remote maneuvering unit, the information is received by a receiving module for receiving information about a figure drawn by a user (for example, step S122 in FIG. 15), a determining step of determining a figure represented by the information, input of the information is controlled at the process of the input controlling step (for example, step S123 in FIG. 15), and an output controlling step of determining data indicating the process associated with the figure determined at the process of the determining step (for example, step S124 in FIG. 15) and controlling output of the data to an information processing unit (for example, step S125 in FIG. 15).

The second program can be recorded in a second recording medium.

Hereinafter, embodiments according to the invention will be described with reference to the drawings.

The basic configuration to which the invention is applied is configured of given devices and a remote maneuvering unit (a remote controller) for instructing the devices to operate. The configuration of the remote controller at least includes a part to draw spots and lines with a thumb by a user for convenient operations, and a part to determine the drawn figure.

Furthermore, a display device for displaying information referred by the user when making instructions with the remote controller is provided when a single remote controller operates multiple devices or when it instructs a multifunction device, for example. When a single remote controller operates multiple devices, the display device shows information which instructions can be made for which devices. Moreover, when a single remote controller instructs a multifunction device, the display device shows information that allows in turn selecting functions hierarchically formed.

Besides, when a single remote controller operates multiple devices, the control unit is provided so as to collectively control the multiple devices. The control unit has a function to acquire information from the multiple devices to be control targets, which receives and processes signals from the remote controller based on the acquired information.

Figure 1:
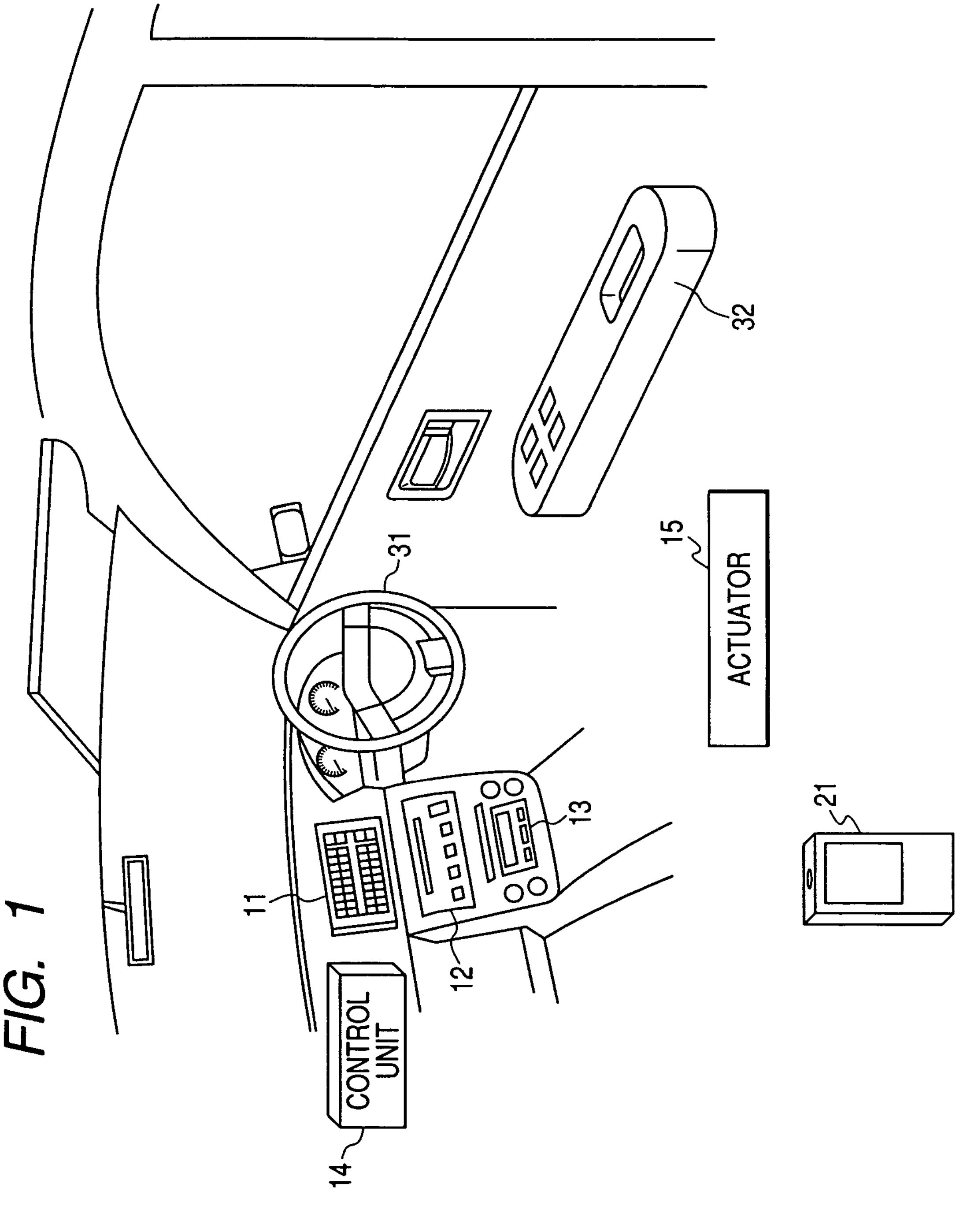
FIG. 1 is a diagram illustrating the configuration of an embodiment of a system to which the invention is applied.

FIG. 1 is a diagram illustrating the configuration of an embodiment of a system to which the invention is applied.

The system shown in FIG. 1 depicts an exemplary configuration where the invention is applied to a device called a car navigation system equipped in a vehicle. The car navigation system uses a GPS (Global Positioning System) and has the functions that allow a user to recognize the run location of the vehicle and guides directions for the user to the destination set by the user.

In the system shown in FIG. 1, the car navigation system is configured of a display 11 and a main body 12. The display 11 is mounted on the place where a user (driver) can see even while driving, for example, on a dashboard of a vehicle. The display 11 shows images such as maps based on data delivered by the main body 12.

In the system shown in FIG. 1, a car audio unit 13 is also provided under the car navigation system. The car audio unit 13 has the functions to reproduce a CD (Compact Disk) and reproduce radio broadcasting.

A remote controller 21 is a device on the user side which instructs these devices. Signals outputted from the remote controller 21 are received by a control unit 14. In the embodiment, the control unit 14 is configured to instruct the main body 12 of the car navigation system and the car audio unit 13 (it passes on instructions from the remote controller 21).

Besides, the remote controller 21 is configured to be in the shape and size that allow the user to carry it. The remote controller 21 is configured to be in the shape and size that allow the user to hold and use it in a vehicle. Furthermore, the remote controller 21 is configured to be mounted on a given part in a vehicle, for example, a steering wheel 31 or an armrest 32, at which the user can reach while driving, allowing the user to use the mounted remote controller 21.

The control unit 14 is configured to be connected to the main body 12 of the car navigation system, the car audio unit 13 and an actuator 15 for sending and receiving data with these devices. The actuator 15 is a part that executes processes relating to the transmission of a vehicle, which is provided to control a gear box, not shown.

Moreover, the control unit 14 is provided separately from the car navigation system here, but it is acceptable that the control unit 14 is configured to be incorporated in the main body 12 of the car navigation system or the car audio unit 13. In addition, it is possible to incorporate the control unit 14 in the remote controller 21.

The control unit 14 sends and receives data with the other devices when receiving signals from the remote controller 21. The control unit 14 executes a process corresponding to the received signal.

Hereinafter, processes executed in the system like this will be described.

First, prior to describing the detail, the outline will be described with reference to FIG. 1. Operation items relating to given devices are shown on the display 11. The remote controller 21 determines the direction operated by the user (here, four directions, upward, downward, right and left directions, are set as the directions operated by the user), and sends the signal in accordance with the determined result to the control unit 14.

In this case, selectable items are shown at locations corresponding to the four upward, downward, right and left directions on the display 11, and the user selects desired items by drawing a line on the remote controller 21 in the direction where a desired item is disposed among the items.

The control unit 14 determines the operated direction by the signal from the remote controller 21, refers to the locations (coordinates) of the items on the display 11 at that point in time, and determines the item corresponding to the operated direction. Then, it instructs the connected devices to execute a process corresponding to the item regarded as selected.

In this manner, in the embodiment, when the user instructs a desired device, the user draws a line toward the direction of the item on the display 11 on the remote controller 21. The embodiment for implementing this will be described. First, the functions of the individual devices will be described with reference to the individual block diagrams, and then the processes in the individual devices will be described.

Figure 2:
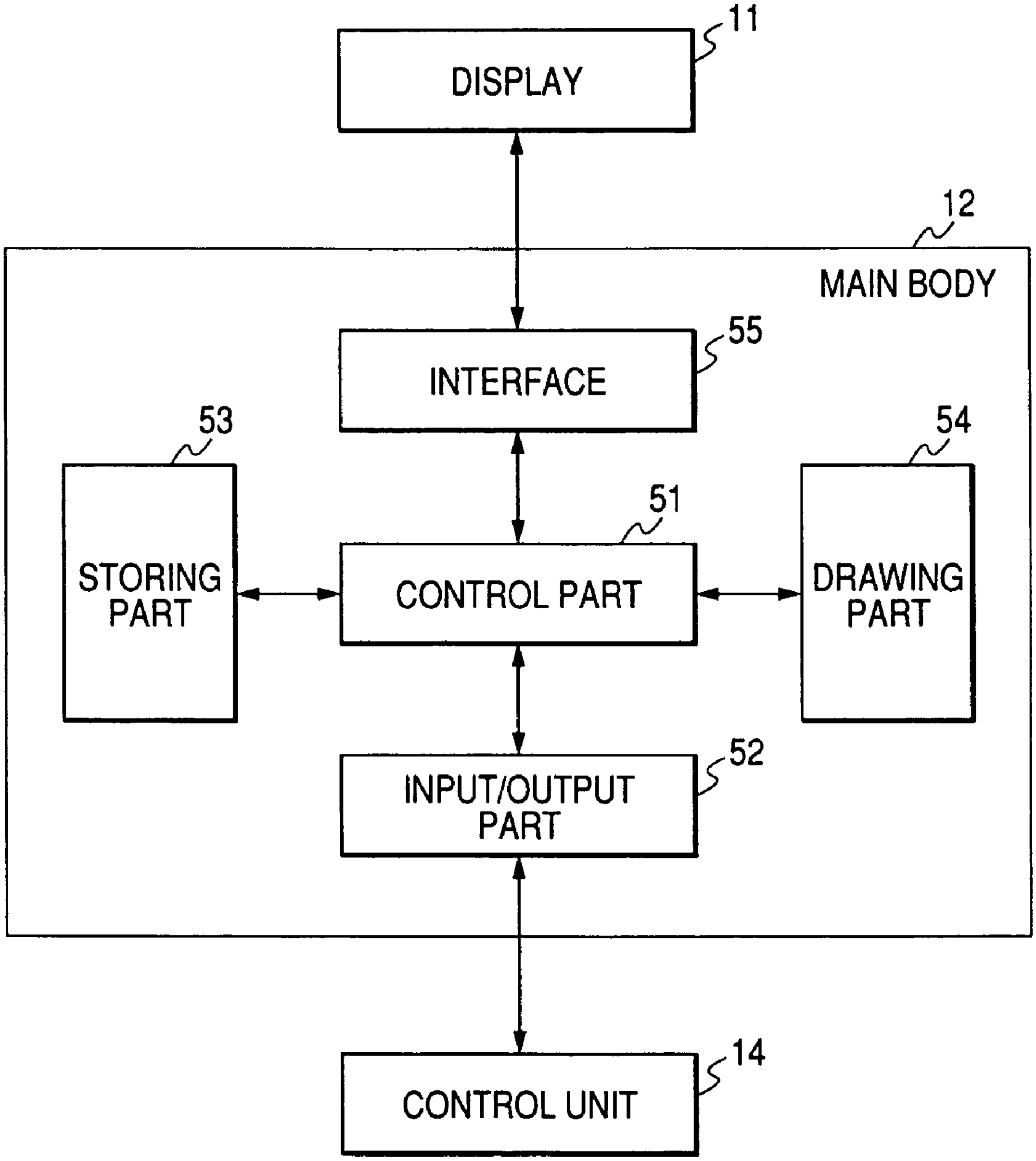
FIG. 2 is a diagram illustrating an exemplary internal configuration of a main body.

FIG. 2 is a block diagram illustrating the function of the car navigation system.

A control part 51 of the main body 12 controls the individual parts in the main body 12. For example, the control part 51 is configured of a CPU (Central Processing Unit). An input/output part 52 is connected to the control unit 14, and sends and receives data with the control unit 14. Based on data inputted to the input/output part 52 from the control unit 14, the control part 51 controls the individual parts of the main body 12. Furthermore, the control part 51 outputs coordinate data, for example, to the control unit 14 as necessary.

It is acceptable that the input/output part 52 and the control unit 14 are configured to send and receive data by using radio such as infrared rays, or to send and receive data by using cables.

A storing part 53 stores programs required for control by the control part 51 and map data relating to road maps therein. For the storing part 53, for example, recording media such as RAM (Random Access Memory), ROM (Read Only Memory), and HDD (Hard Disk Drive) undetachable to the main body 12, or recording media such as DVD-ROM (Digital Versatile Disk-Read Only Memory) detachable to the main body 12 are acceptable. Furthermore, the combination of those recording media is also acceptable.

A drawing part 54 is configured of VRAM (Video Random Access Memory), which draws a map based on map data read out of the storing part 53 under control by the control part 51, and delivers the drawn map to the display 11 through an interface 55. The drawing part 54 also draws the item selected by the user as necessary, and delivers it to the display 11 through the interface 55. By drawing in this way, given items are sometimes shown on the display 11 over the map. For example, this can be implemented by using the function called OSD (On Screen Display).

When the drawing part 54 draws an item, data relating to the location (coordinates) at which the item is placed on the display 11 (hereinafter, it is described as coordinate data properly) is delivered to the control unit 14 through the input/output part 52 under control by the control part 51.

In addition, in FIG. 2, although portions required for the embodiment described below are shown and described, the car navigation system is also provided with an antenna and a tuner, not shown, for processing television broadcasting.

Figure 3:
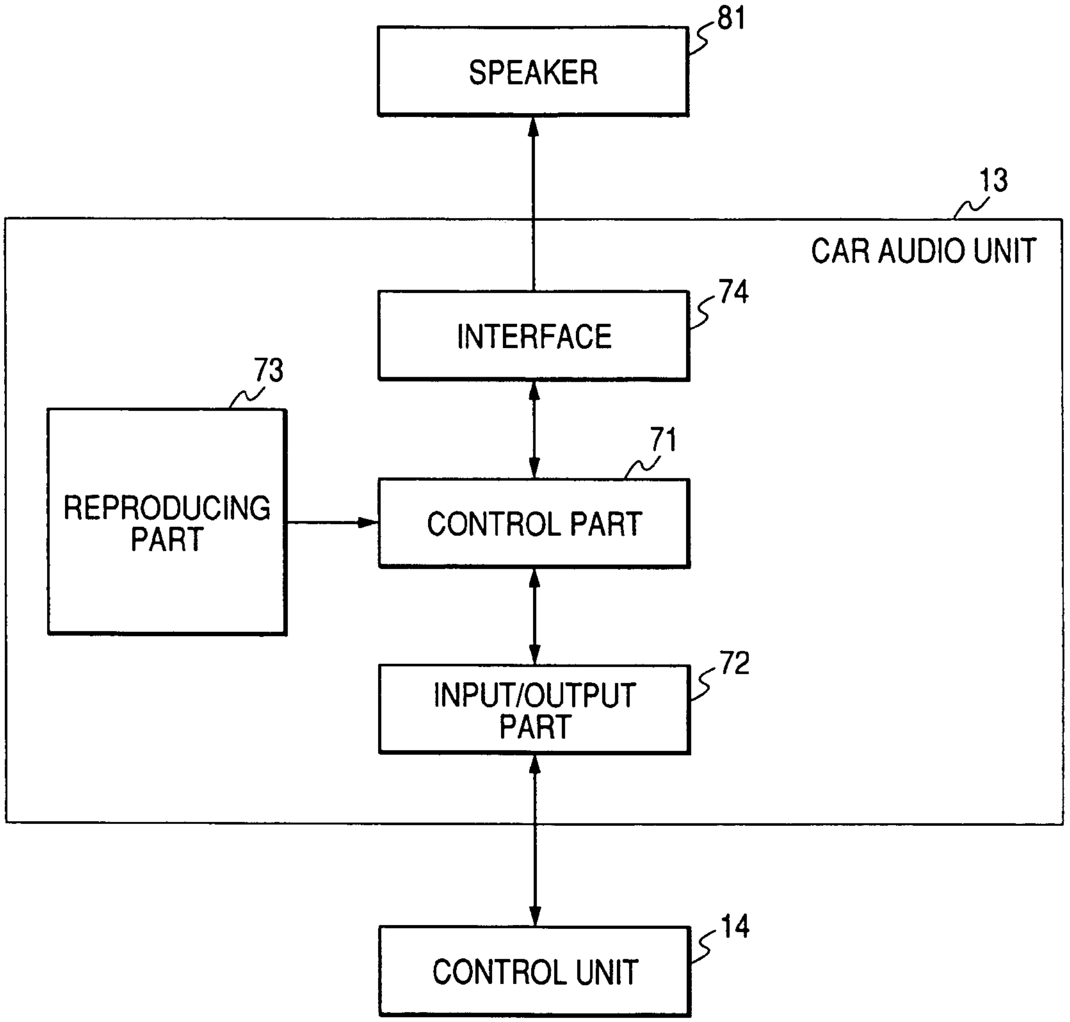
FIG. 3 is a diagram illustrating an exemplary internal configuration of a car audio unit.

FIG. 3 is a block diagram illustrating the function of the car audio unit 13.

A control part 71 controls the individual parts in the car audio unit 13. An input/output part 72 is connected to the control unit 14, which sends and receives data with the control unit 14. Based on data inputted to the input/output part 72 from the control unit 14, the control part 71 controls the individual parts of the car audio unit 13. Furthermore, the control part 71 outputs coordinate data, for example, to the control unit 14 as necessary.

A reproducing part 73 reads data out of a given recording medium, such as CD and MD ((Mini-Disk) (registered trademark)), set to a drive not shown in the drawing for reproduction. An interface 74 provides the reproduced data to a speaker 81.

When the car audio unit 13 does not have the function to execute the same process as that of the drawing part 54 (FIG. 2), it is acceptable to configure it to connect to the main body 12 of the car navigation system through the interface 74 in order to perform the process of providing coordinate data relating to operation items to the control unit 14. Then, it is acceptable to provide a scheme that the operation item relating to the operations of the car audio unit 13 is drawn by the connected drawing part 54 of the main body 12 and coordinate data is delivered to the control unit 14.

Moreover, when the car audio unit 13 has a display part (not shown), it is acceptable to allow the display part to show operation items.

It is fine to provide any configurations as long as this is done that the control unit 14 is provided with coordinate data indicating locations of operation items on the display 11 relating to the audio unit 13 and the operation items are drawn on the display 11.

Figure 4:
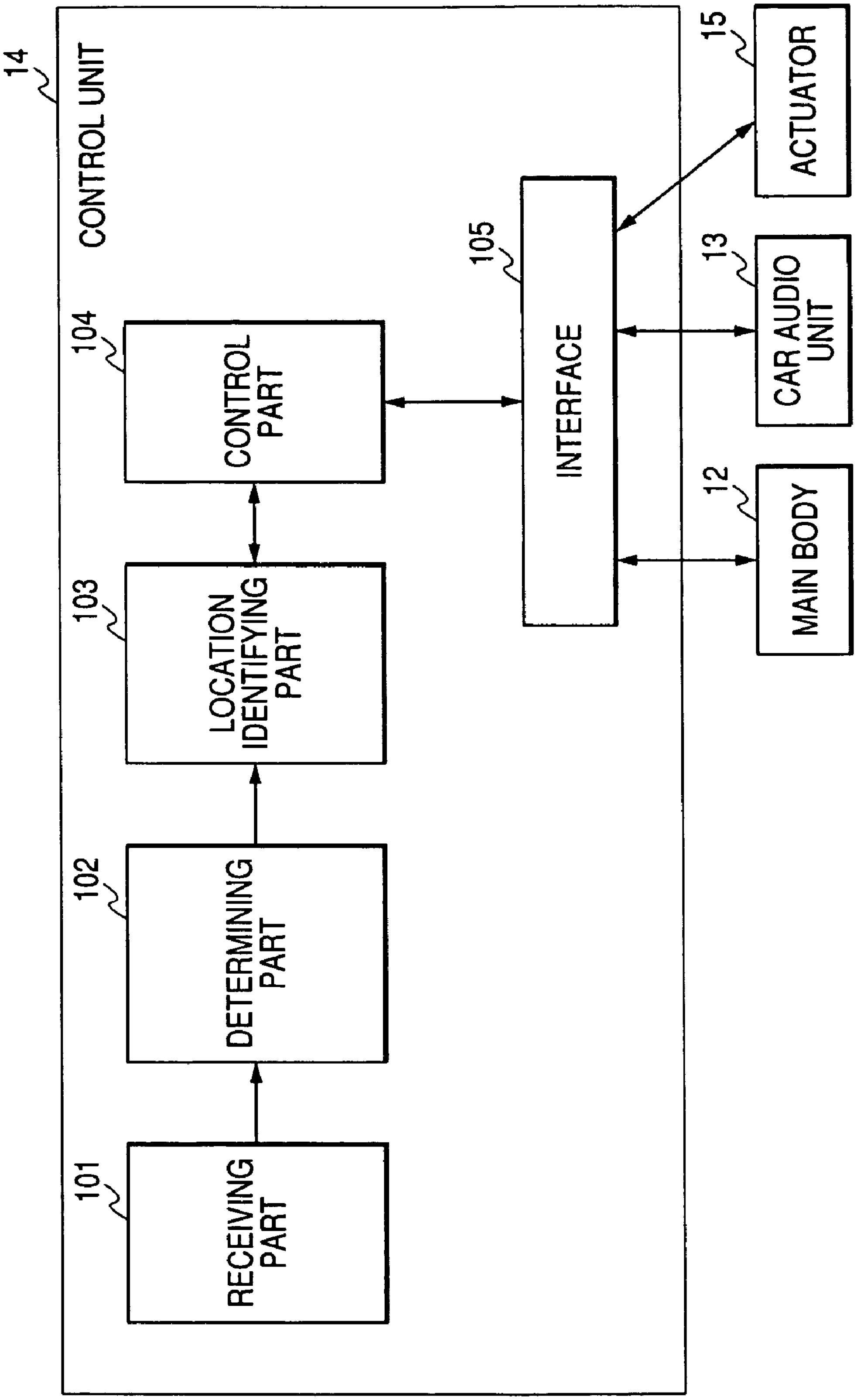
FIG. 4 is a diagram illustrating an exemplary internal configuration of a control unit.

FIG. 4 is a block diagram illustrating the function of the control unit 14.

A receiving part 101 of the control unit 14 receives signals from the remote controller 21. The signal from the remote controller 21 is the signal indicating that a line (figure) drawn by the user orients toward which direction (what shape the figure is). For example, the signal is the signal that is determined by referring to the figure drawn by the user and a table with which the signal indicating that figure (frequencies) is associated.

This signal is received by the receiving part 101 and delivered to a determining part 102. The determining part 102 determines the direction indicated by the delivered signal (figure). The determining part 102 creates data relating to the determined direction, and delivers it to a location identifying part 103. To the location identifying part 103, coordinate data indicating the location of items shown on the display 11 is also delivered from the control part 104. The location identifying part 103 uses data relating to the delivered direction and coordinate data delivered, and determines the item located in the direction operated by the user (one direction among the upward, downward, right and left directions). The determined result is delivered to the control part 104.

The control part 104 outputs the determined result delivered by the location identifying part 103 to the corresponding device through an interface 105. The interface 105 is connected to the main body 12 of the car navigation system, the car audio unit 13, and the actuator 15.

In addition, here, the control unit 14 is provided in order to collectively operate the other devices such as the car navigation system and the actuator 15 by the remote controller 21. For example, when the invention is applied only to the car navigation system, the control unit 14 is of course incorporated in the main body 12 as well as the configuration of the control unit 14 shown in FIG. 4 is modified properly. More specifically, the configuration of the control unit 14 shown in FIG. 4 does not mean limitations as similar to the configurations of the other devices.

Figure 5:
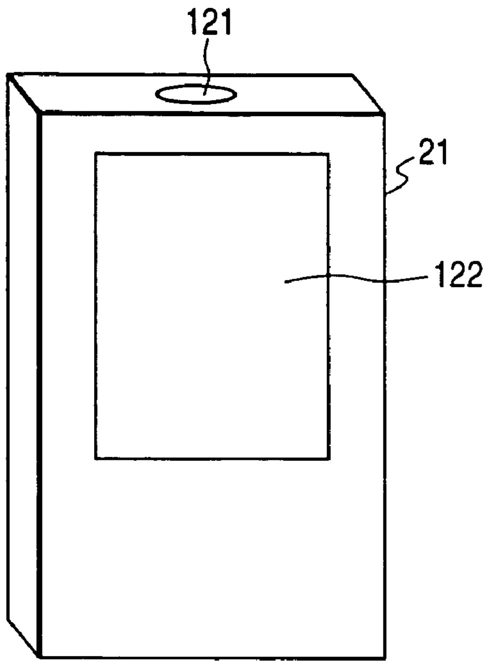
FIG. 5 is a diagram illustrating the configuration of the outer appearance of a remote controller.

FIG. 5 is a diagram illustrating the configuration of the outer appearance of the remote controller 21.

The remote controller 21 is provided with a transmitting part 121 for transmitting the signal indicating the user's operations. This transmitting part 121 sends signals by radio such as infrared rays. A touch panel 122 is considered to have the structure that can detect a part touched by the user. In other words, the touch panel 122 is considered to have the structure that can acquire coordinates of the location touched by the user.

Furthermore, for the purpose of allowing the user to confirm the operated direction (the direction recognized by the remote controller 21), it is acceptable that a display and LEDs (Light Emitting Diodes) are provided beneath a translucent member in the under side of the touch panel 122 to show an arrow showing the direction determined that the user has operated.

FIG. 6 is a diagram illustrating an exemplary internal configuration of the remote controller 21.

The instruction by the user inputted from the touch panel 122 of the remote controller 21 is delivered to the drawing direction determining part 123. When the user makes some instructions to a given device, the user draws a line on the touch panel 122. More specifically, the operations to draw lines are performed with respect to the remote controller 21 in the embodiment; the traditional operations to press down buttons are not performed thereto. This means that instructions are made by two-dimensional (linear) operations instead that instructions are made by traditional one-dimensional (spot) operations.

The drawing direction determined by the drawing direction determining part 123 is converted to the signal indicating the direction, and sent by the transmitting part 121.

Hereinafter, the operations of the system shown in FIG. 1 formed of the devices with these configurations will be described.

Figure 7:
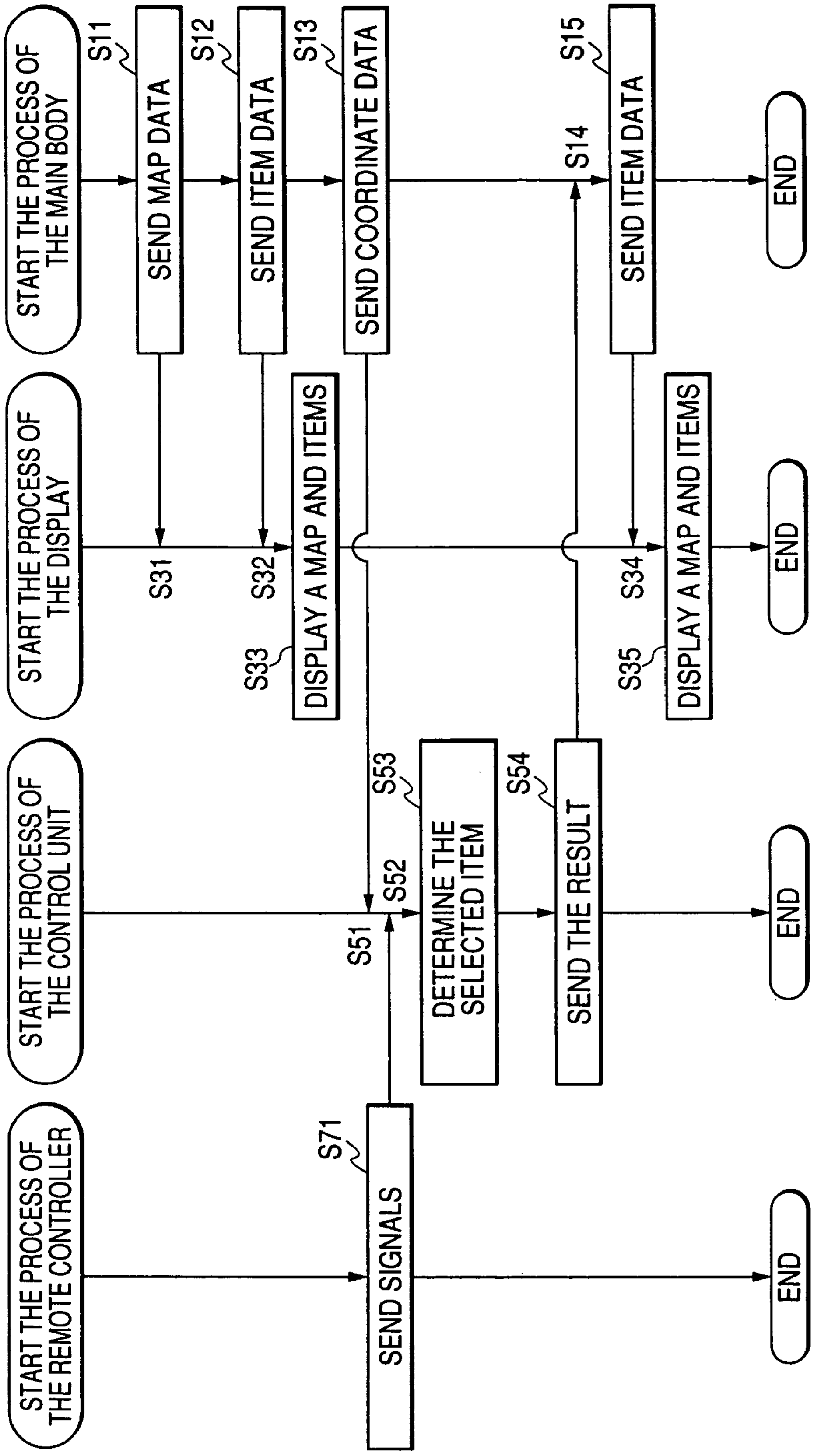
FIG. 7 is a flow chart for describing the operations of the system.

First, the outline of the operations of the overall system will be described with reference to a flow chart shown in FIG. 7, and then the detailed operations of the individual devices will be described with reference to other flow charts.

At step S11, the main body 12 of the car navigation system transmits maps to the display 11. The control part 51 (FIG. 2) reads out map data stored in the storing part 53, and provides it to the drawing part 54, and then the drawing part 54 draws maps. Subsequently, the drawn maps are provided to the display 11 through the interface 55.

Figure 8:
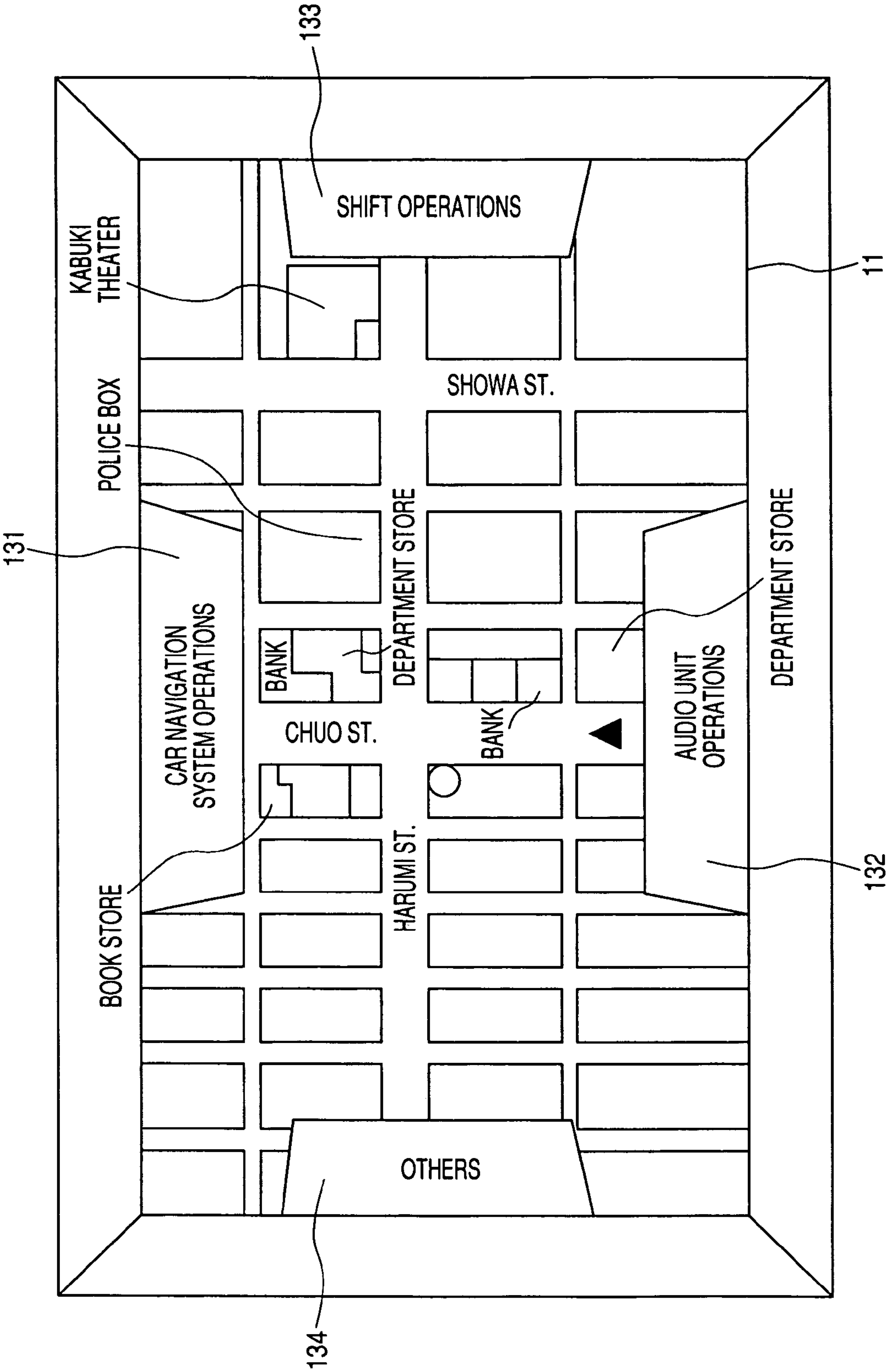
FIG. 8 is a diagram illustrating an exemplary screen shown on a display.

Moreover, at step S12, the main body 12 also draws items to be shown on the maps, and transmits data of the items to the display 11. At steps S31 and S32, the display 11 receives the drawn data of the maps and items. Then, at step S33, the display 11 shows the maps and items based on the received drawn data. FIG. 8 is a diagram illustrating an exemplary screen shown on the display 11 at step S33.

On the screen of the display 11 shown in FIG. 8, a map is shown and four items are represented over the map. On the upper side of the screen, an item 131, 'operations of the car navigation system,' is shown. When this item 131 is operated, operations can be done that relate to the car navigation system such as scale up and down of the map, audio guide on and off, and setting routes.

On the under side of the screen, an item 132, 'operations of the car audio unit,' is shown. When this item 132 is operated, operations can be done that relate to the car audio unit 13 such as controlling volumes, changing channels of radio broadcasting, and skipping music numbers.

On the right side of the screen, an item 133, 'shift operations,' is shown. When this item 133 is operated, operations can be done for the actuator 15 such as shifting up and shifting down.

On the left side of screen, an item 134, 'others,' is shown. When this item 134 is operated, the other items not operated by the items 131 to 133 can be operated, including temperature control by an air controller.

At step S33, the screen is displayed on the display 11 as shown in FIG. 8. In the meantime, at step S13, the main body 12 transmits coordinate data relating to the locations at which the items 131 to 134 are shown on the screen to the control unit 14. The coordinate data sent from the main body 12 is received by the control unit 14 at step S51. The control unit 14 stores the received coordinate data in a storing part (not shown) of the control part 104.

When the screen shown in FIG. 8 is displayed on the display 11, the user can select the items displayed. When the user operates the remote controller 21 for intending to select the items displayed on the display 11 (in this case, the items 131 to 134), that is, the user draws a figure, the signal corresponding to the operation is sent from the remote controller 21 to the control unit 14 as the process at step S71.

At step S52, when the control unit 14 receives the signal from the remote controller 21, it determines the item selected by the user at step S53. At step S53, data relating to the item determined that the user has selected is created, and the created data is sent at step S54.

Although the detail will be described later, it is acceptable that the data created at step S54 simply indicates what the selected item is, or is data instructing a given device to execute the process by selecting the item. It is design matters to properly set what data is to be created.

At step S14, the main body 12 receives the transmitted data. At step S14, the main body 12 executes the processes corresponding to the received data. Among one of them, drawn data relating to the item is created and sent at step S15. By selecting a single item, the other items associated with that selected item are provided to the user side as the subsequent items.

At step S34, the display 11 having received the item data sent from the main body 12 shows new items on the screen based on the received data at step S35.

Here, among the items on the screen shown in FIG. 8, suppose the user selects the item 131, 'operations of the car navigation system.' When the item 131 is selected, the user draws an upward line (a line from bottom to top) on the touch panel 122 of the remote controller 21, because the item 131 is disposed on the upper side of the screen. Data indicating that the upward line has been drawn is created by the remote controller 21, and is sent to the control unit 14 (step S71).

In addition to this, the user touches the touch panel 122 by a finger, moves the finger, and draws a line (the user moves the finger as skims on the touch panel 122, and draws a line); the user does not operate buttons on which a line (an arrow) is depicted.

When the control unit 14 receives the data (step S52), it determines the direction indicated by the received data as the process at step S53. Then, consequently, it is determined that the direction is upward in this case. The determined result and coordinate data are used to determine the item disposed on the upper side. In this case, it is determined that the user has selected the item 131.

The determined result showing that the item 131 has been selected is sent to the main body 12 at step S54. The main body 12 recognizes from the sent data that the item 131 has been selected. Then, drawn data of the items is created, and sent to the display 11; the items are set as the items to be displayed when the item 131 has been operated. The drawn data is sent to the display 11 as well as coordinate data of each item is sent to the control unit 14.

Figure 9:
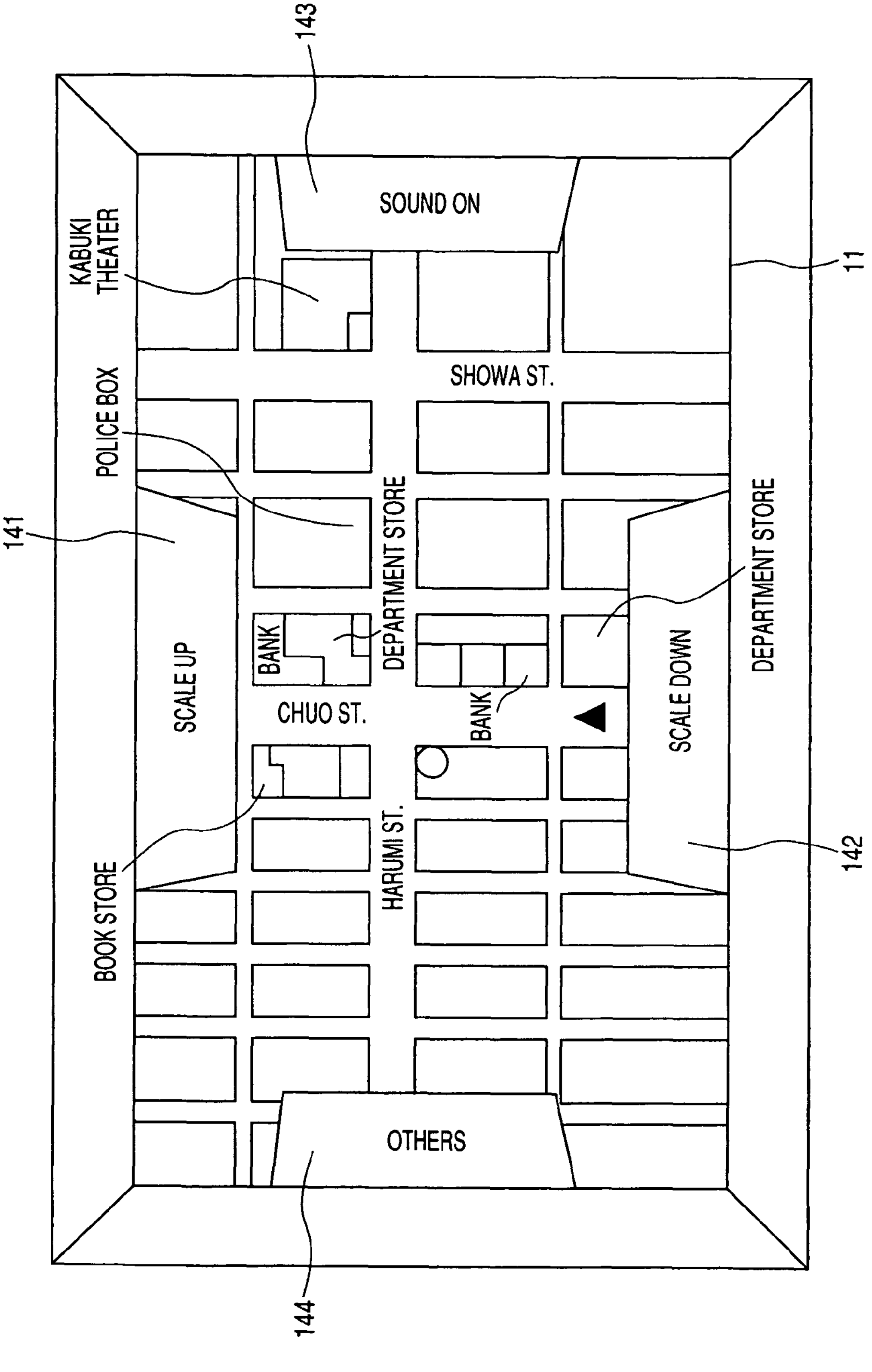
FIG. 9 is a diagram illustrating an exemplary screen shown on the display.

At step S35, by operating the item 131, the items 131 to 134 on the screen of the display 11 are switched to new items. FIG. 9 is a diagram illustrating an exemplary screen shown on the display 11 at step S35.

On the screen shown in FIG. 9, an item 141, 'scale up,' that is selected when the user wants to scale up a map displayed on the display 11, an item 142, 'scale down,' that is selected when the user wants to scale down the map, an item 143, 'sound on,' that is selected whether the guidance is done by sound, and an item 144, and 'the others,' that is selected when the user sets items not to be done by the items displayed thereon are shown on the display 11 as new items for the items 131 to 134.

In this manner, when selecting the items displayed on the display 11, the user simply draws the direction where the selected item is shown on the touch panel 122 of the remote controller 21. The operation of simply drawing a line on the touch panel 122 like this can be done without paying attention on that operation itself, and the user can do it safely even while driving.

In order to implement the process like this, the processes done by the individual devices will be described. First, the process of the remote controller 21 will be described with reference to a flow chart shown in FIG. 10.

At step S101, the drawing direction determining part 123 (FIG. 6) determines whether the touch panel 122 has accepted input. At step S101, the process at step S101 is repeated until it is determined that the touch panel 122 has accepted input, and thus a wait state is maintained. Then, at step S101, when it is determined that the touch panel 122 has accepted input, the process proceeds to step S102.

At step S102, the coordinates of a line drawn on the touch panel 122 by the user are acquired. Input to the touch panel 122 is always monitored. For example, a resistive touch panel can be used for the touch panel 122. When a touch panel 122 is a resistive touch panel, that touch panel 122 is configured to have two resistive films facing each other in which when the user touches and presses down one of the resistive films, and then touches the other resistive film. Furthermore, the resistive film itself is configured to be applied with voltage.

The potential measured when the resistive films do not contact to each other at a given location on the touch panel 122 (that is, the user does not touch the panel) and the potential measured when the resistive films contact to each other (that is, the user touches the panel) have different values. Moreover, even though the user touches the panel, different potentials are detected when the locations being touched are different on the resistive films.

By utilizing this to measure potential, the resistive touch panel is configured to detect the location at which the user touches on the touch panel 122. The time for measuring potential (sampling time) is set beforehand, and the location at which the resistive film is contacted is detected at every sampling time.

With this scheme, the processes at steps S101 and S102 are performed. More specifically, at step S101, as the result of measuring potential at every sampling time, it is determined that input has been accepted when changes are observed in the measured potential. Then, at step S102, the location (coordinates) on the touch panel 122 determined from the changes in potential is decided.

In this manner, when the coordinates of the location at which the user has touched on the touch panel 122 are acquired, the direction of the line drawn by the user is determined at step S103. The coordinates acquired at every sampling time are sequentially connected to recognize a line. Then, the start and the end of the line are determined to decide the direction of the line.

How to determine the direction operated by the user will be further described with reference to FIG. 11.

Figure 11:
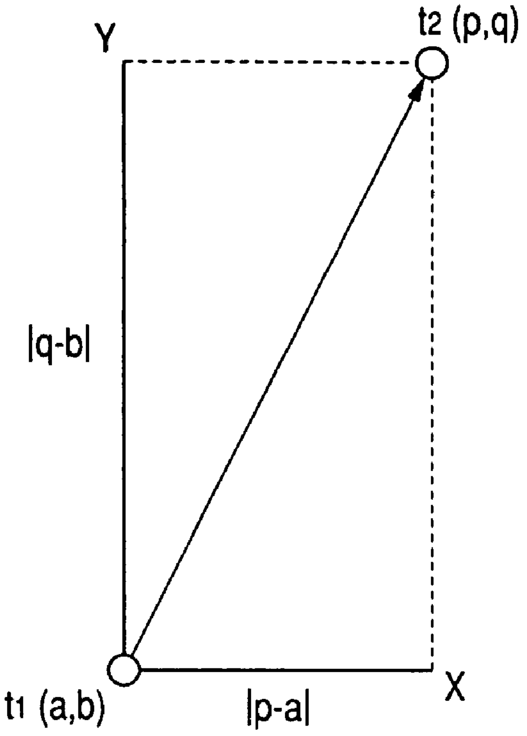
FIG. 11 is a diagram for describing how to determine directions.

An arrow show in FIG. 11 has coordinates (a, b) detected at time t1 as the start and coordinates (p, q) detected at time t2 as the end. Here, time t1 and time t2 satisfy the relation, time t1<time t2. In addition, in the description below, the sign 'arrow' means 'a line drawn by the user,' and 'showing the direction of the line from the start to the end.'

The interval between time t1 and time t2 may be a single sampling time, or other than this. In other words, it is acceptable that the direction is determined at every sampling time, or that input is set to the end from when the start is set to when a given sampling time elapses and then the direction is determined at given sampling time intervals.

With reference to FIG. 11, the magnitude of the arrow (vector) in the X-direction is represented by $|p-a|$, and the magnitude in the Y-direction is represented by $|q-b|$. First, the magnitude in the X-direction $|p-a|$ is compared with the magnitude in the Y-direction $|q-b|$. Then, it is decided whether to be the change in the lateral direction (the X-axis direction) or in the vertical direction (the Y-direction). More specifically in this case, it is determined as the change in the lateral direction when $|p-a|>|q-b|$, and as the change in the vertical direction when $|p-a|<|q-b|$.

It is roughly determined from the magnitude of the vector whether the operated direction is the vertical direction or the lateral direction, and then it is determined in detail whether to be upward or downward when it is the vertical direction whereas whether to be right or left when it is the lateral direction. The determination is made in which the operated direction is the lateral direction (the X-axis direction) by the process described above, for example, and then the differential (p−a) between the coordinates p in the X-axis direction at time t2 and the coordinates a in the X-axis direction at time t1 is calculated. Then, when the differential (p−a) is zero or greater, in this case it is determined that the line has been drawn in the positive direction of the X-axis, that is, drawn in the right direction. When the differential (p−a) is zero or below, in this case it is determined that the line has been drawn in the negative direction of the X-axis, that is, drawn in the left direction.

Furthermore, when it is determined that the operated direction is the vertical direction (the Y-axis direction) from the process described above, it is determined whether to be the upward direction or the downward direction by basically the same process. More specifically, the differential (q−b) between the coordinates q in the Y-axis direction at time t2 and the coordinates b in the Y-axis direction at time t1 is calculated. When the differential (q−b) is zero or greater, in this case it is determined that the line has been drawn in the positive direction of the Y-axis, that is, drawn in the upward direction. When the differential (q−b) is zero or below, in this case it is determined that the line has been drawn in the negative direction of the Y-axis, that is, drawn in the downward direction.

In this manner, the direction determined that the user has operated is detected. However, as described above, when the direction determined that the user has operated is detected, the magnitude of the X-direction $|p-a|$ is sometimes equal to the magnitude of the Y-direction $|q-b|$. More specifically, when the relation $|p-a|=|q-b|$ is satisfied, the rough direction determined that the user has operated cannot be decided.

Figure 12:
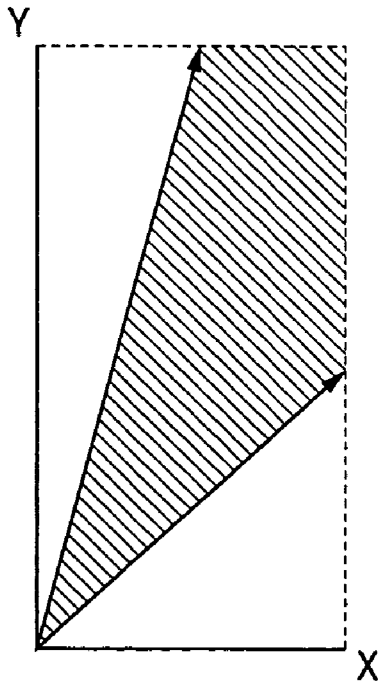
FIG. 12 is a diagram for describing an area not to be determined.

In this case, in other words, when the direction operated by the user is determined as ambiguous, the instruction by the user is not to be accepted. For example, when it is determined that an arrow (vector) exists in a given area, the direction of that arrow is not determined, and the subsequent process is not executed. For example, as shown in FIG. 12, when it is determined that an arrow exists in the part depicted by oblique lines, that input is considered to be invalid for processing.

More specifically, since four directions, the upward, downward, left, and right directions are set as determination targets, the oblique direction is not included as a determination target. Moreover, the oblique direction is ambiguous, and thus it is not set as a determination target. Therefore, error processing can be prevented: for example, even though the user recognizes to have selected the upward direction, the remote controller 21 recognizes that the right direction has been selected for processing.

In the description so far, the user makes an instruction by drawing a line on the touch panel 122. It is acceptable that the user can further make an instruction by depicting (tapping) spots. Depicting spots is implemented in which the user presses down one point on the touch panel 122. When the rate of change is zero both in the X-axis direction and the Y-axis direction, that is $|p-a|=|q-b|=0$, it is determined that a spot has been depicted. In addition, it is also acceptable that it is treated as zero when the numeric values are not only strictly zero but also in a given area and thus it is determined that a spot has been drawn.

When a spot is depicted, these processes are executed; for example, the process that items displayed on the display 11 are deleted to display only a map, the process that display is returned to the screen shown previously (or the initial screen shown in FIG. 8), and the process that power is turned off.

In this manner, five operations are set for the user's operations, four directions, the upward, downward, left and right directions, and spots. Signals indicating the five operations set are to be created as the process at step S104. It is acceptable for the created signals that numerals '1' for the upward direction, '2' for the downward direction, '3' for the left direction, '4' for the right direction, and '5' for the spot, for example, are associated with the individual operations represented by these numerals.

Furthermore, when five operations are set including spots other than lines, the drawing direction determining part 123 (FIG. 6) determines whether the figure represented by coordinate data is a line or a spot from that coordinate data. Then, when the drawing direction determining part 123 determines that it is a line, it determines the direction indicated by that line, and creates the signal indicating that direction, whereas it determines that it is a spot, it creates the signal indicating that spot. As described above, it is acceptable that the signal indicates numerals associated with given figures.

Moreover, it is acceptable that although it is not the user's direct operations, the condition that the user does not touch the touch panel 122 (thus, the user does not operate the remote controller 21) is set as one operation (six operations are set). In this manner, even the condition that the user does not operate is determined as one form of operations, and then the process can be executed; for example, items shown on the display 11 are deleted to show only a map.

Figure 13:
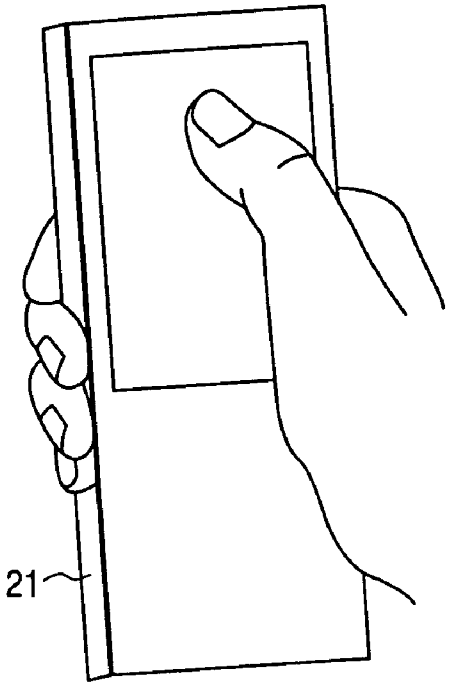
FIG. 13 is a diagram illustrating a state that the remote controller is held.

In the meantime, for the shape and size of the remote controller 21, as shown in FIG. 13, for example, the shape and size are designed so that the user can operate by the thumb when the user holds it by one hand (for example, the right hand), that is, the user can draw a line in a given direction and depicts a spot. With this design, simply moving the thumb allows selecting desired items (processes). Therefore, the user can conveniently and surely select desired items (processes) even in the condition that the user can pay attention on the operations of the remote controller 21 as well as the condition that the user cannot solely pay attention on the operations of the remote controller 21, for example, while driving.

Figure 14:
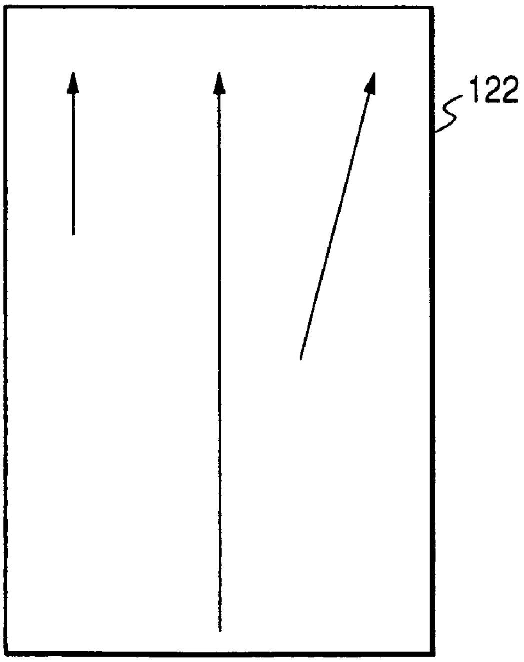
FIG. 14 is a diagram for describing lines to be drawn.

When a line is drawn on the touch panel 122 in the condition shown in FIG. 13, for example, the user draws an upward line, that line is not always drawn as a line from the start to the end. More specifically, as shown in FIG. 14, for upward lines drawn by the user, many lines are considered such as a short line on the left of the touch panel 122, a long line in the center of the touch panel 122, and an upward but oblique line on the right of the touch panel 122.

Even lines with different starts and ends can be determined as upward lines by the process described above for processing when they are drawn upward. More specifically, the remote controller 21 is so configured that can determine the upward lines as upward lines for processing regardless of the location on the touch panel 122 or length.

Therefore, when the user draws a line on the touch panel 122, even a line relatively roughly drawn allows executing the process accurately on the devices. Thus, the user can operate with less attention than to operate buttons for instruction, being very convenient.

Figure 10:
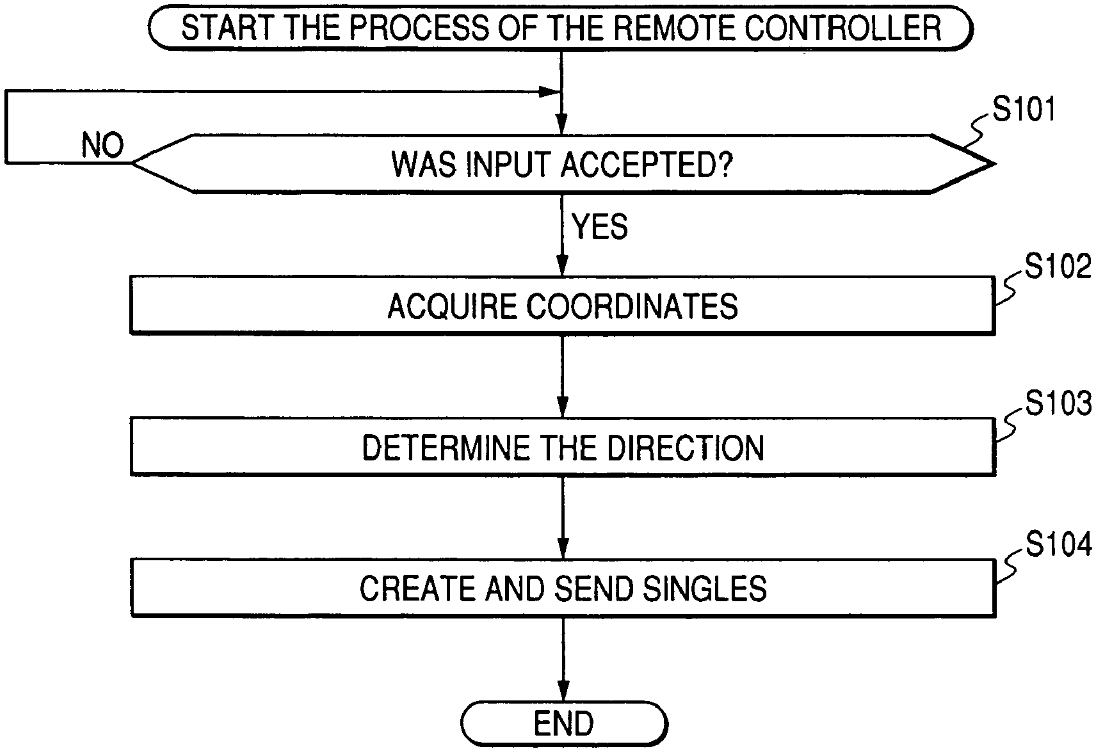
FIG. 10 is a flow chart for describing the operations of the remote controller.

Return to the description of the flow chart shown in FIG. 10, when the drawing direction determining part 123 determines the direction operated by the user at step S103, data based on the determined result is created and sent at step S104. More specifically, when the direction operated by the user is determined as the right direction, for example, data indicating 'the right direction' is created, and the transmitting part 121 sends the data to the control unit 14.

This process is repeatedly performed in the remote controller 21.

Next, the process of the control unit 14 will be described with reference to a flow chart shown in FIG. 15.

At step S121, the control part 104 (FIG. 4) of the control unit 14 receives coordinate data and processing data from the main body 12 through the interface 105.

First, the coordinate data received at step S121 will be described. The coordinate data is data indicating the locations of the individual items 131 to 134 on the exemplary screen of the display 11 shown in FIG. 8, for example. Then, the coordinate data is used for determining the items disposed in the direction operated by the user. Thus, it is fine for the coordinate data that data allows determining the locations of the individual items.

For example, again referring to FIG. 8, an area having a given size is allocated for the item 131 on the upper side of the screen. One spot in the displayed area, for example, only the coordinates of the spot located at center are delivered as coordinate data relating to the item 131 to the control unit 14. Similarly, it is fine for the other items that the coordinate data at one spot in the displayed area is delivered to the control unit 14.

Alternatively, it is acceptable that data indicating the locations of items displayed, for example, data indicating that the item 131 is disposed on the upper side is delivered to the control unit 14, not coordinate data.

Next, the processing data will be described. The processing data is data associated with items. When the user selects an item, the process is executed based on processing data associated with the selected item. A specific example is taken for description. Again referring to FIG. 8, an example is taken for description that the item 131, 'operations of the car navigation system' is selected.

The item 131 is the item operated when the car navigation system is desired to be operated. Then, when the item 131 is operated, as shown in FIG. 9, the items 131 to 134 are switched to items 141 to 144 for operating the car navigation system. Thus, processing data associated with the item 131 is data that instructs the main body 12 of the car navigation system to show the items 141 to 144 shown in FIG. 9.

Furthermore, again referring to FIG. 9, an example is taken for description that the user selects the item 141, 'scale up.' The item 141 is the item to be operated when the user wants to scale up a map shown on the display 11. The processing data associated with the item is data that instructs the main body 12 of the car navigation system to scale up the map for display.

When the main body 12 of the car navigation system delivers the coordinate data and processing data as the process at step S121, the control unit 14 turns in the wait state for an instruction by the user. Then, it receives the instruction by the user at step S122, the process proceeds to step S123. Here, the instruction by the user is the signal from the remote controller 21, and the signal is received at step S122.

At step S123, the determining part 102 (FIG. 4) determines the direction of the line drawn by the user. The signal from the remote controller 21 relates to the direction of the line drawn by the user as described above, and is received by the receiving part 101 of the control unit 14. The received signal is delivered to the determining part 102. The determining part 102 determines the direction of the line drawn by the user from the delivered signal. Subsequently, data based on the determined result is created, and delivered to the location identifying part 103.

At step S124, the location identifying part 103 determines the item selected by the user. The location identifying part 103 identifies the item located in the direction indicated by the data delivered by the determining part 102. For example, in the case where the direction indicated by the data delivered by the determining part 102 is 'upward' when the screen shown in FIG. 8 is displayed on the display 11, the location identifying part 103 identifies that the user has selected the item 131. The location identifying part 103 delivers data indicating the identified item to the control part 104.

At step S125, the control part 104 identifies the item selected by the user from the data indicating the item delivered by the location identifying part 103, and reads out processing data associated with the item. Then, the control part 104 transmits the processing data read out to the corresponding device. For example, when the item 131 (FIG. 8) is selected, processing data is sent to the main body 12 of the car navigation system because the item 131 is the item selected when the car navigation system is to be operated.

When the process is finished, the control part 104 instructs the main body 12 to update items at step S126. More specifically, when a single item is selected, an instruction is made to show the subsequent items associated with the selected item. For example, the item 131 (FIG. 8) is selected, the main body 12 is instructed to newly show the items 141 to 144 on the display 11.

This process is repeatedly performed in the control unit 14.

In addition, when the signal from the remote controller 21 received at step S122 is the signal indicating a spot, it is determined as the spot at step S123. Consequently, the processes at steps S124 to S126 are omitted, and the process set as the process done when a spot is inputted is executed.

For example, when the process set as the process when a spot is inputted is one that returns to the previous items, an instruction is made to return to the previous items.

Figure 15:
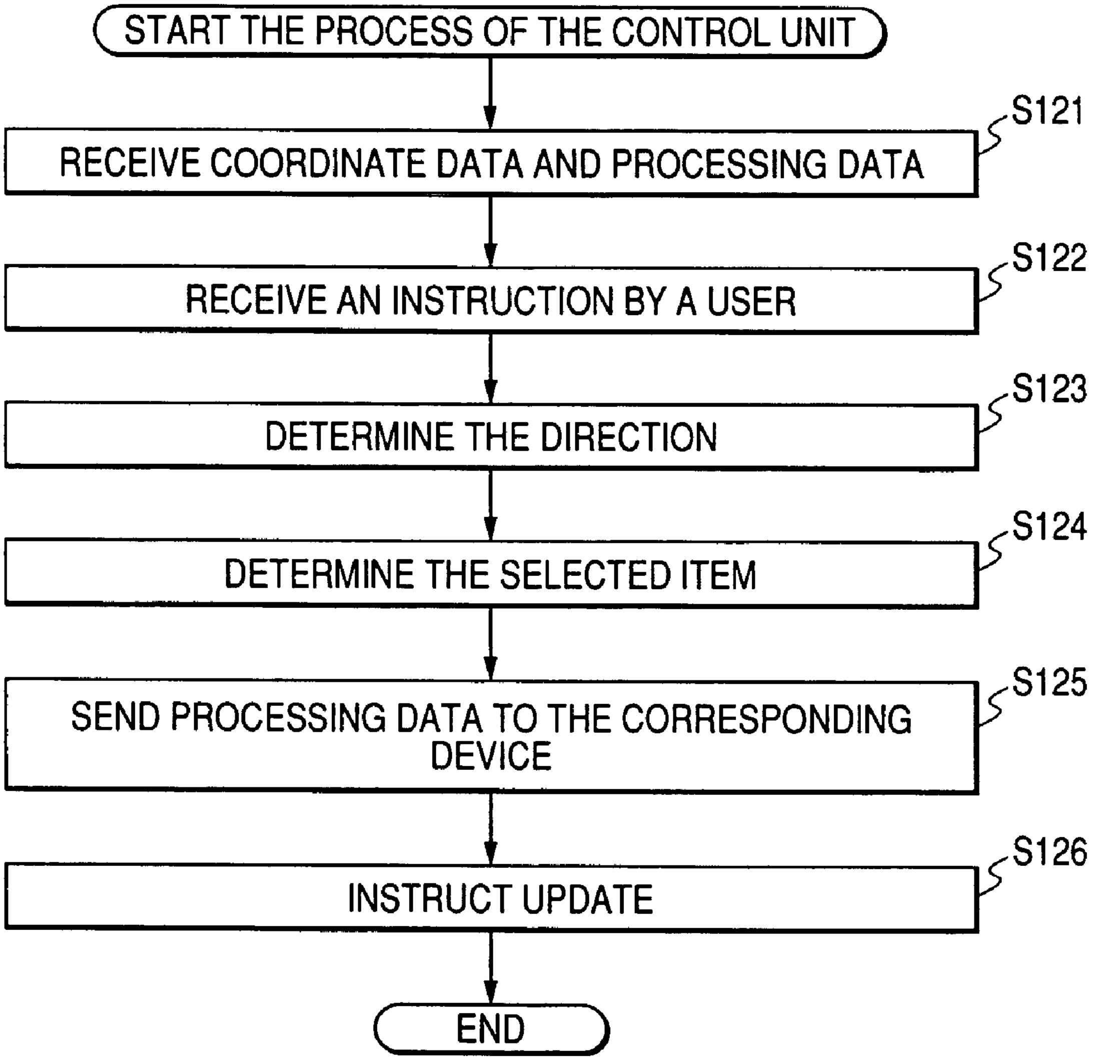
FIG. 15 is a flow chart for describing a process of the control unit.

A specific example is taken for further description on the process of the flow chart shown in FIG. 15. In the case where the user selects the item 132, 'operations of the audio unit' when the screen shown in FIG. 8 is displayed on the display 11, the screen is switched to a screen (items) shown in FIG. 16.

In this case, the control unit 14 determines that the line drawn by the user is downward at step S123, and determines that the item 132 has been selected at step S124. Then, processing data associated with the item 132 in this case is data that indicates the items to operate the car audio unit 13.

Therefore, at step S125, the control unit 14 instructs the car audio unit 13 to show items 161 to 164 on the display 11 for operating the car audio unit 13. The car audio unit 13 having instructed to do so delivers data relating to the items to operate the car audio unit 13 itself to the control unit 14 through the interface 105. At this time, processing data is also delivered.

At step S126, the control unit 14 sends data relating to the delivered items 161 to 164 and data to instruct update to the main body 12. The main body 12 uses data relating to the delivered items 161 to 164 to create drawn data based on the delivered instruction, and delivers it to the display 11. By this process, the items 161 to 164 shown in FIG. 16 are displayed on the display 11.

Here, as shown in FIG. 4, data relating to the items 161 to 164 are considered to be delivered to the main body 12 through the control unit 14 as described above, because the control unit 14 is connected to the car audio unit 13 through the interface 105 for sending and receiving data. However, it is acceptable that the main body 12 is configured to be connected to the car audio unit 13 for directly sending and receiving data.

When the main body 12 is connected to the car audio unit 13, it is acceptable that the car audio unit 13 directly delivers data relating to the items 161 to 164 to the main body 12, not through the control unit 14.

Figure 16:
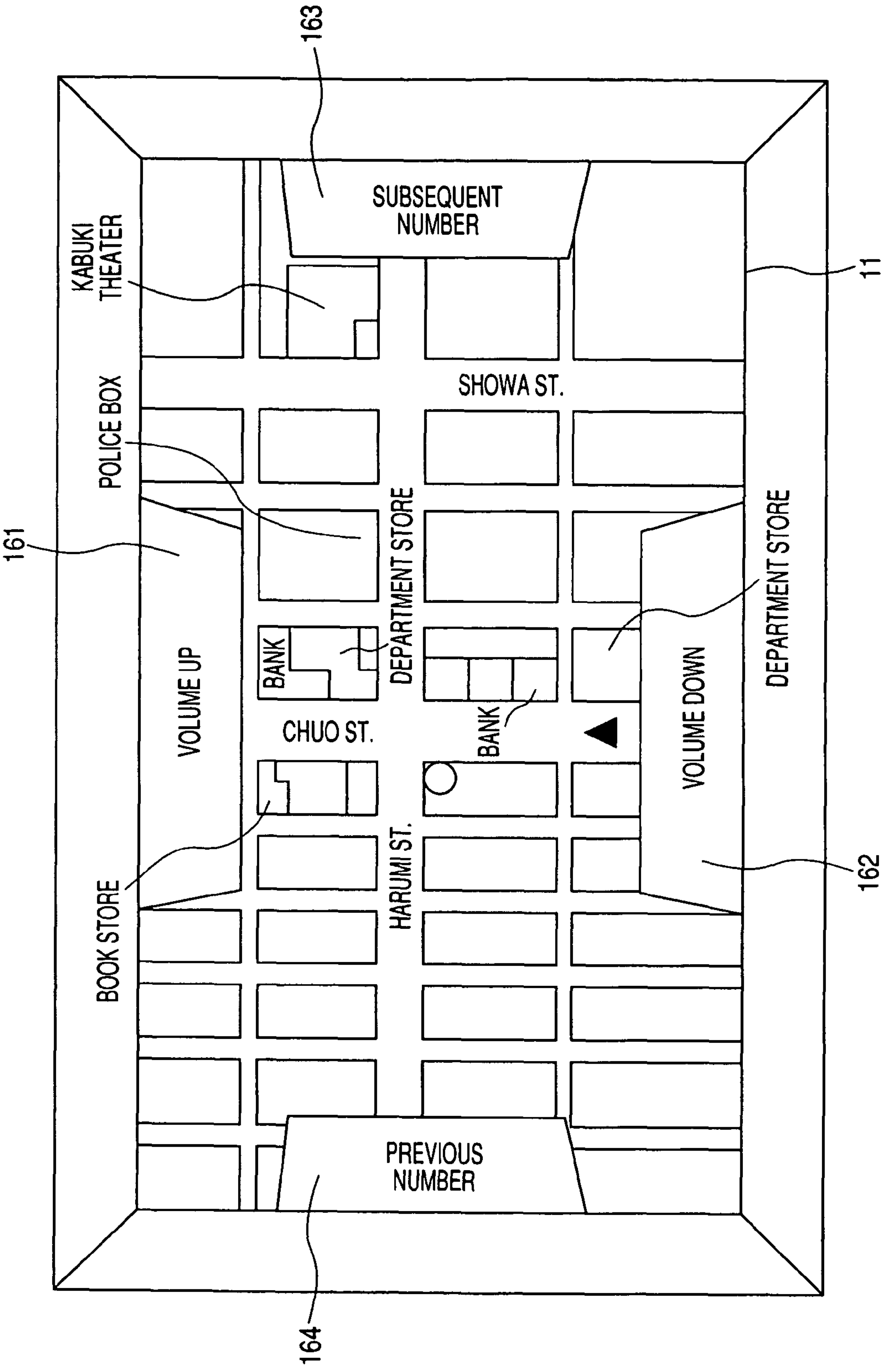
FIG. 16 is a diagram illustrating an exemplary screen shown on the display.

In the case where the screen shown in FIG. 16 is displayed on the display 11, when the user draws an upward line on the touch panel 122 of the remote controller 21, the control unit 14 determines that the item 161, 'volume up' has been selected at step S124. The processing data associated with the item 161 is data that instructs the car audio unit 13 to turn up the volume.

For the process at step S125, the control unit 14 instructs the car audio unit 13 to turn up the volume based on the processing data. In this case, since the items remain on the display 11, the control unit 14 instructs the main body 12 to maintain that state as the process at step S126.

In this manner, the user can conveniently instruct the car audio unit 13 to turn up the volume. Similarly, the user can instruct the car audio unit 13 to turn down the volume by simply drawing a downward line on the touch panel 122.

In response to the case where the user wants to operate the car navigation system when the screen shown in FIG. 16 is displayed, it is acceptable to provide a scheme that the screen on the display 11 is switched to the screen shown in FIG. 8 when a spot is drawn on the touch panel 122, for example, and the item 131 is shown for operating the car navigation system.

In this manner, the user can select items corresponding to desired operations by simply drawing a line on the touch panel 122. Therefore, the user can easily operate the car audio unit 13 even while driving. In addition to this, the user unlikely to solely pay attention on that operation, and thus the user can perform desired operations.

Figure 17:
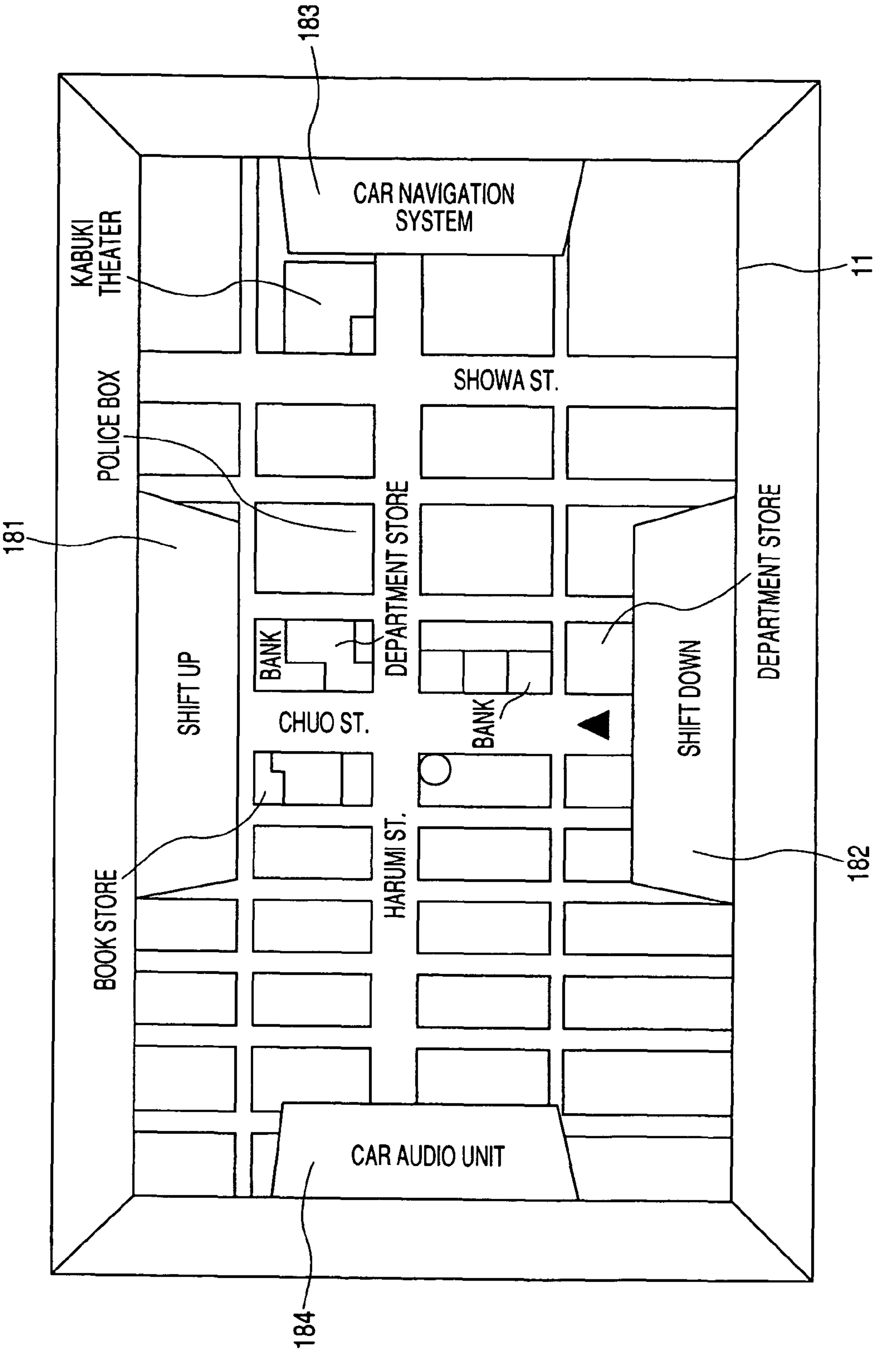
FIG. 17 is a diagram illustrating an exemplary screen shown on the display.
Figure 18:
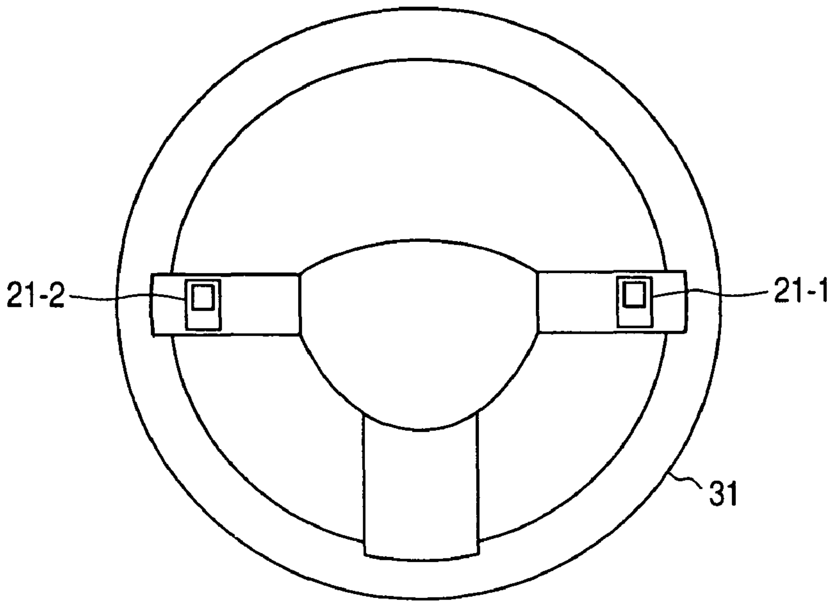
FIG. 18 is a diagram illustrating a steering wheel on which remote controllers are mounted.

Next, the case will be described when the user selects the item 133, 'sift operations,' on the screen shown in FIG. 8. Also when the item 133 is operated, the remote controller 21 and the control unit 14 basically execute the processes described above. Therefore, the items 131 to 134 on the display 11 are switched to the items relating to shift operations. FIG. 17 is a diagram illustrating an exemplary screen on the display 11 where the items relating to the shift operations are disposed.

In FIG. 17, an item 181, 'shift up,' and an item 182, 'shift down,' are shown. These two items 181 and 182 are operations relating to shifting. For the operations relating to shifts, it is acceptable that these two items 181 and 182 are shown on the display 11. Then, in the exemplary screen shown in FIG. 17, an item 183, 'the car navigation system,' and an item 184, 'the car audio unit,' are disposed on the right and left of the screen on the display 11.

Since the items 183 and 184 do not directly relate to the shift operations, it is fine not to show the items on the screen when only the shift operations are done.

In addition, the items shown on the display 11 are not limited to those shown in the drawing, which can be modified properly and are fine to be decided in consideration of the user's convenience when designing. Besides, it is acceptable to provide a function that allows the user by him/herself to set which items are shown on the display 11 at which scene.

Among the items shown in FIG. 17, when the item 181, 'shift up,' is operated, shifting is up, whereas the item 182, 'shift down,' is operated, shifting is down. Here, shifting means that gears are changed in a vehicle.

Nowadays, vehicles called manual transmission vehicles and automatic transmission vehicles are on the market. Briefly, the manual transmission vehicle is the vehicle that a user changes gears at any timing, and the automatic transmission vehicle is the vehicle that changes gears at programmed timing beforehand without user's operations.

In recent years, in the automatic transmission vehicles, some vehicles provide gear operations close to those of the manual transmission vehicles, that is, functions that can change gears at desired timing by a user. Furthermore, some vehicles have functions that are close to the manual transmission vehicle but can change gears only by operating a lever called a paddle equipped on a steering wheel with no need for a user to operate a clutch. These vehicles are sometimes generally called semi-manual transmission vehicles and semi-automatic transmission vehicles.

In the vehicles that the user can decide the timing of gear changes, here, it is called shift up when the user gears up, and it is called shift down when the user gears down. Moreover, operations relating to shifting up and shifting down are properly called shift operations.

When shifting up or shifting down is instructed, an instruction is made to the actuator 15 (FIG. 1). The actuator 15 controls a gear box (not shown). The gear box is controlled to control shifting up and shifting down.

The operations relating to actual shifting (shifting up and shifting down) are performed in relation between various operations such as separating the clutch and control of rotation speed other than the operations of the actuator 15 and the gear box. These operations vary depending on vehicles, and the detail of the operations does not directly relate to the invention, and thus the description is omitted here. Hereinafter, it is considered that control of the actuator 15 executes the process of shifting up or shifting down for description.

In this manner, the shift operations such as shifting up or shifting down directly relate to driving vehicles (done while driving). Therefore, taking account of the conditions for the shift operations, it is considered that the user often does the operations while holding the steering wheel 31 (FIG. 1). In the embodiment, the shift operations are also done by operating the remote controller 21, that is, by drawing a line (spot) on the touch panel 122.

Then, taking account of the user's convenience, it is considered that the shift operations can be done more preferably while holding the steering wheel 31 than while holding the remote controller 21 as shown in FIG. 13. It is considered to be convenient that the remote controller 21 is mounted on the steering wheel 31 or the armrest 32 (FIG. 1) at least within the user's reach even while holding the steering wheel 31.

Figure 19:
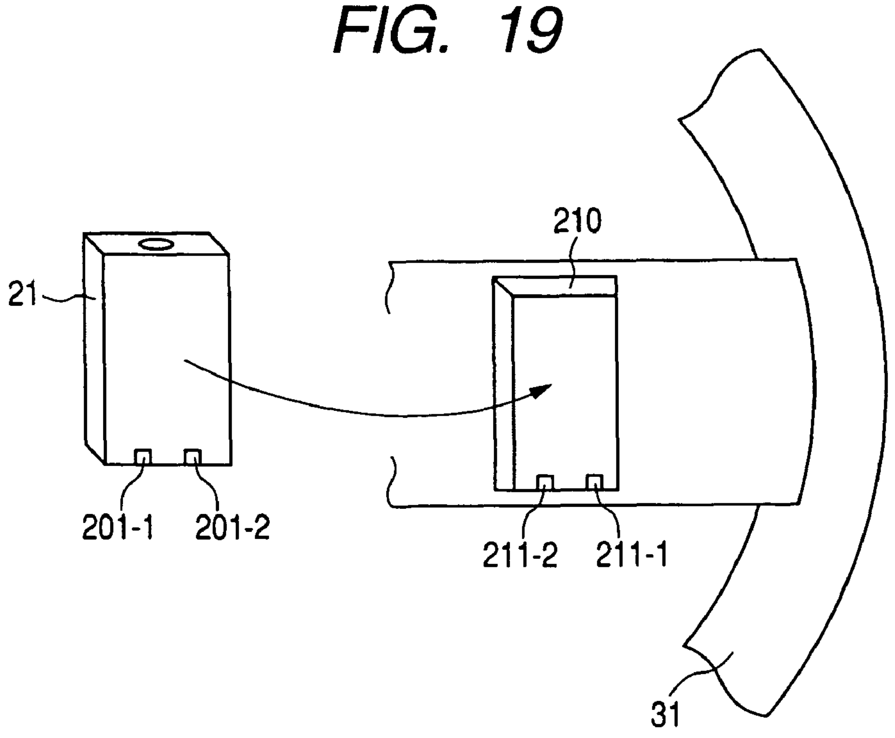
FIG. 19 is a diagram illustrating the configuration when the remote controller is mounted on the steering wheel.

Then, as shown in FIG. 19, the remote controller 21 is formed to be mounted on a steering wheel 31. On the steering wheel 31 shown in FIG. 19, two remote controllers 21-1 and 21-2 are mounted.

The remote controllers 21 are provided right and left, respectively, in order to allow the user to operate the remote controllers 21 by right hand or left hand. Furthermore, since the steering wheel 31 rotates, the two remote controllers 21-1 and 21-2 are provided to allow 360-degree operations in order to avoid the remote controller 21 to be at the location where it cannot be operated.

Since the steering wheel 31 rotates, the transmitting part 121 (FIG. 5) is not sometimes oriented toward the control unit 14 when the remote controllers 21 are mounted on the steering wheel 31. On this account, the signal transmitted by the remote controller 21 is unlikely to be received by the control unit 14.

Moreover, when the remote controller 21 is configured detachably with respect to the steering wheel 31, the remote controller 21 is likely to drop off when the steering wheel 31 rotates in the case where the remote controller 21 is simply hung and mounted on the steering wheel 31.

Then, as shown in FIG. 19, a recess 210 in which the remote controller 21 is housed is provided in the steering wheel 31. The remote controller 21 is configured to be housed in the recess 210, and thus the remote controller 21 is prevented from dropping off even when the steering wheel 31 rotates. In addition, it is acceptable that magnets are provided and the remote controller 21 is configured detachably to the steering wheel 31 are by using the attraction of the magnets.

As shown in FIG. 19, terminals 201-1 and 201-2 are provided on the remote controller 21, and terminals 211-1 and 211-2 are provided on the steering wheel 31. It is configured in which the remote controller 21 is housed in the recess 210, the terminal 201-1 of the remote controller 21 is contacted to the terminal 211-1 of the steering wheel 31, and the terminal 201-2 of the remote controller 21 is contacted to the terminal 211-2 of the steering wheel 31.

The terminals 211-1 and 211-2 provided on the steering wheel 31 are connected to the control part 104 (FIG. 4) of the control unit 14, for example (for example, they are configured as a part of the interface 105). The terminals are contacted, and thus the remote controller 21 is configured to send and receive data with the control unit 14. With this configuration, even though the steering wheel 31 rotates, instructions from the remote controller 21 can be reliably delivered to the control unit 14.

Furthermore, it is acceptable that the remote controller 21 is not configured detachably to the steering wheel 31, and is configured as a part of the steering wheel 31 (configured to be mounted on the steering wheel 31 all the time, and configured integrally with the steering wheel 31).

In the meantime, in consideration of only the shift operations, two operations are enough for shifting up or shifting down. In other words, it is fine to select the items 181 and 182 on the screen of the display 11 shown in FIG. 17. Further in other words, in the shift operations, a line to be drawn on the touch panel 122 of the remote controller 21 is in only two directions, the upward direction or the downward direction.

Therefore, in consideration of only the shift operations, it is fine to configure the remote controller 21 to determine two directions, upward or downward direction. More specifically, the condition is not necessarily provided that the oblique direction is not included as a determination target as described with reference to FIG. 12. Taking account of these, it is fine to configure the remote controller 21 to have the function that determines whether it has been mounted on the steering wheel 31 (whether to be housed in the recess 210) and to have the function that switches determination criterion relating to directions when determined as mounted (the former function can be implemented by the configuration in which physical switches determine whether the terminal 201 is contacted to the terminal 211).

Moreover, it is fine to provide multiple remote controllers 21 in a vehicle. For example, it is acceptable to separately provide the remote controllers 21 for the shift operations and for the car navigation system and the car audio unit 13.

Besides, the remote controller 21 for the shift operations is configured integrally with the steering wheel 31, and the remote controller 21 for the car navigation system is configured to be held by the user as shown in FIG. 13.

In this manner, when the separate remote controllers 21 are used for the shift operations and for the other operations, the remote controller 21 for the shift operations can be configured to determine two directions, the upward and downward directions as described above. Therefore, the size of the remote controller 21 itself can be reduced (at least the lateral dimensions can be reduced), and thus the structure easily integrated with the steering wheel 31 can be formed.

In the embodiment described above, the items are shown on the display 11. When the separate remote controllers 21 operate the shift operations and the car navigation system, it is acceptable that only items operated by one of the remote controllers 21 (for example, the remote controllers 21 for the car navigation system) are shown on the display 11.

In addition, when the remote controller 21 for the shift operations is provided separately from the remote controller 21 for the car navigation system, the items selected by the remote controller 21 for the shift operations are two, 'shift up' or 'shift down.' The user easily conceives the association of the upward direction with up and the downward direction with down, and thus two items for these are not necessarily shown on the display 11. Thus, as described above, only the items relating to the operations of the car navigation system can be shown on the display 11.

When the invention is applied in this case, the user can also change shifting only by drawing a line on the touch panel 122 of the remote controller 21 upward or downward for the shift operations.

When the remote controller 21 is mounted on the steering wheel 31, the upward direction and the downward direction need to be determined in consideration that the steering wheel 31 rotates. The necessity for this determination will be described with reference to FIG. 20. In addition, FIG. 20 depicts that a single remote controller 21 is mounted on the steering wheel 31 for convenience of the description.

Figure 20:
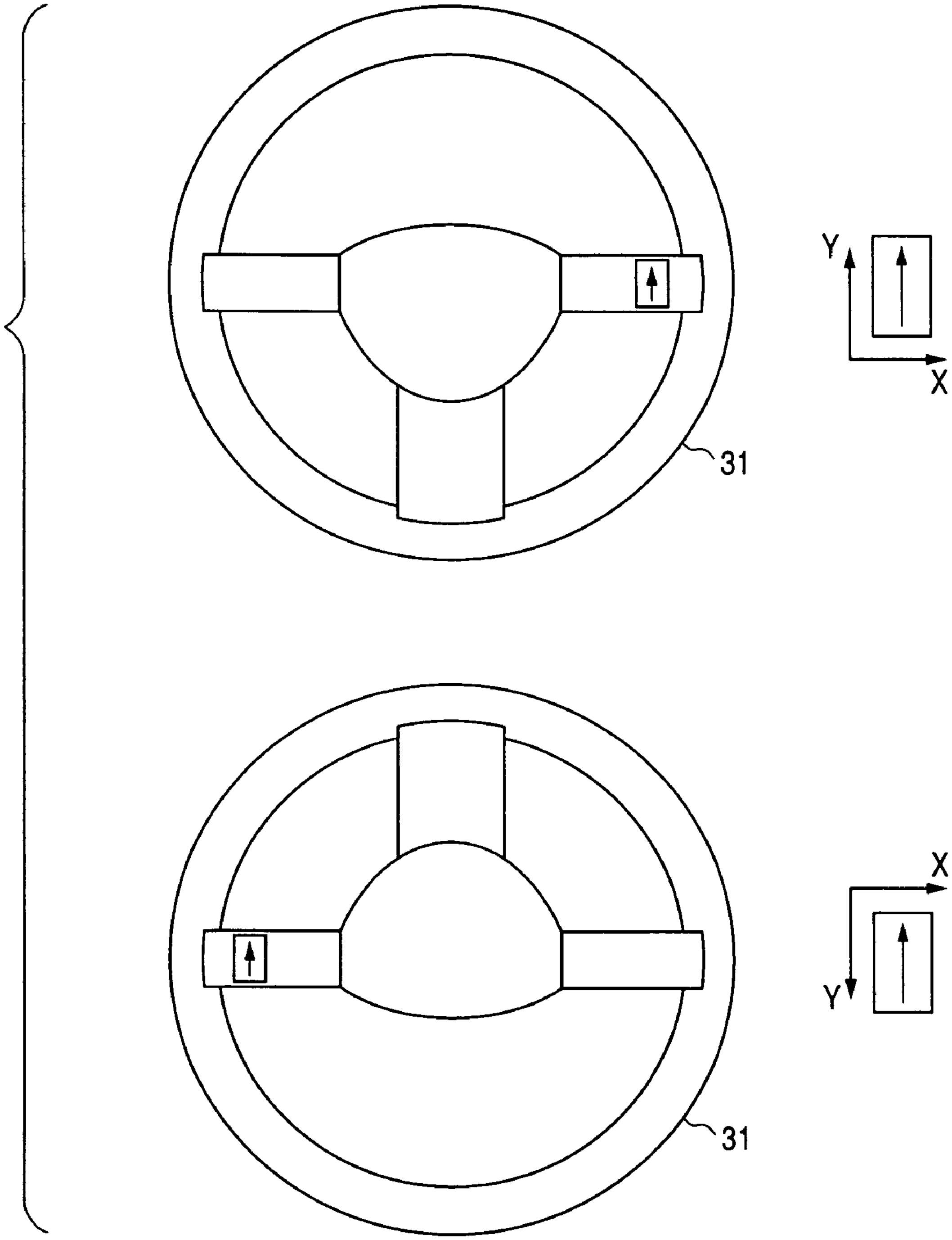
FIG. 20 is a diagram for describing rotation angles.

The diagram shown on the upper side of FIG. 20 depicts that the steering wheel 31 does not rotate (tires are located on the same lines in the traveling direction of the vehicle). In this state, as show in the upper side of FIG. 20, the X-axis is positive rightward, and the Y-axis is positive upward in the drawing. Therefore, when the user draws an upward line on the touch panel 122, it is successfully determined as the upward line.

Contrary, the diagram shown in the lower side of FIG. 20 depicts that the steering wheel 31 rotates at an angle of 180 degrees from the steering wheel 31 depicted in the upper side of FIG. 20. In this state, as shown in the lower side of FIG. 20, the X-axis is positive rightward, and the Y-axis is positive downward. Therefore, even when the user draws an upward line on the touch panel 122, it is determined as a downward line because that line is toward the negative side of the Y-axis.

As described above, the line drawn by the user is sometimes determined as a line in the direction different from the direction intended by the user without correcting an angle in accordance with the angle (rotation angle) at which the steering wheel 31 rotates. Then, in order to avoid this inconvenience, when the remote controller 21 is mounted on the steering wheel 31, or when the remote controller 21 relates to the shift operations, the configuration of the function relating to the process until an instruction is made to the actuator 15 is as shown in FIG. 21.

The configuration of the function relating to the shift operations shown in FIG. 21 is configured of the remote controller 21, a direction correcting part 231, a rotation information providing part 232, a shift determining part 233, and the actuator 15.

The signal from the remote controller 21 is delivered to the direction correcting part 231. The signal from the rotation information providing part 232 is also delivered to the direction correcting part 231. The direction correcting part 231 first determines the direction of the line drawn by the user from the delivered signal by the remote controller 21. However, the direction does not take into account of the rotation angle of the steering wheel 31, and thus the signal from the rotation information providing part 232 is used to correct the determined direction.

The rotation information providing part 232 delivers the signal indicating the rotation angle of the steering wheel 31. For example, the rotation information providing part 232 creates the signal indicating that the rotation angle of the steering wheel 31 is an angle of 180 degrees when it is 180 degrees, and delivers it to the direction correcting part 231. The direction correcting part 231 determines the rotation angle from the signal relating to this rotation angle, and corrects the direction of the line drawn by the user by that rotation angle.

For example, when the line drawn by the user is determined as the downward line (the direction of an angle of −90 degrees) and the rotation angle is determined as an angle of 180 degrees, that is, it is determined as the conditions shown in the lower side of FIG. 20, the direction correcting part 231 adds an angle of 180 degrees to an angle of −90 degrees. From the result of this addition, the calculation result of an angle of 90 degrees is obtained. More specifically, an angle of −90 degrees is corrected to an angle of 90 degrees. Then, an angle of 90 degrees indicates the upward direction, and thus the line drawn by the user is determined as upward.

In this manner, the direction corrected by the direction correcting part 231 is delivered to the shift determining part 233. The shift determining part 233 determines the direction indicated by the delivered signal. Consequently, when it is determined as upward, an instruction is made to the actuator 15 to shift up. Inversely, when it is determined as downward, an instruction is made to the actuator 15 to shift down.

In this manner, information about the rotation angle of the steering wheel 31 is used to correct the direction drawn by the user, and thus the direction of the line drawn by the user can be determined accurately all the time.

It is fine to provide the direction correcting part 231 and the rotation information providing part 232 at positions connected to the terminal 211 in the steering wheel 31. Alternatively, it is fine to provide them at positions connected to the terminal 201 in the remote controller 21 through the different system line from the transmitting part 121.

Furthermore, when the shift operations are configured to perform separately from the operations of the car navigation system, the direction correcting part 231, the rotation information providing part 232, and the shift determining part 233 are provided inside the steering wheel 31 between the remote controller 21 and the actuator 15.

Moreover, when the shift operations are configured to be performed along with the operations of the car navigation system, it can be implemented by executing basically the same processes as the processes described above through the control unit 14. When this configuration is done, it is fine that the direction correcting part 231 and the rotation information providing part 232 are provided inside the steering wheel 31 and the signal outputted from the direction correcting part 231 is delivered to the determining part 104 (FIG. 4) of the control unit 14. The shift determining part 233 can be configured as the determining part 102.

When the configuration is made in this manner, a single remote controller 21 allows multiple operations to be executed.

In addition, when the remote controller 21 is configured detachably to the steering wheel 31, the remote controller 21 can be used instead of a key for the vehicle. For example, a scheme can be provided in which an ID is stored in the remote controller 21, the ID is read out when the remote controller 21 is mounted on the steering wheel 31, and the ID read out is matched (it is also fine to input given letters to the touch panel 122) to start the engine.

Besides, when the remote controller 21 is configured detachably, the remote controller 21 is also configured to instruct a television receiver at home, for example, in addition to the devices equipped in the vehicle.

The reason why the remote controller 21 can instruct the television receiver is that the remote controller 21 determines only the direction of the line drawn by the user whereas devices select the selected items and processing data in the embodiment described above. Therefore, also in devices such as the television receiver, the control unit 14 is configured along with the television receiver, or the television receiver itself is configured to have the function that can execute the process done by the control unit 14 (the process in the flow chart shown in FIG. 15). Thus, the user can operate the television receiver as similar to the car navigation system.

In the embodiment described above, the description is made in which the control unit 14 is provided, the control unit 14 receives the signal from the remote controller 21, performs the processes, and instructs the other devices (for example, the main body 12). It is acceptable that the control unit 14 is configured integrally with the main body 12, not separately thereto.

Figure 22:
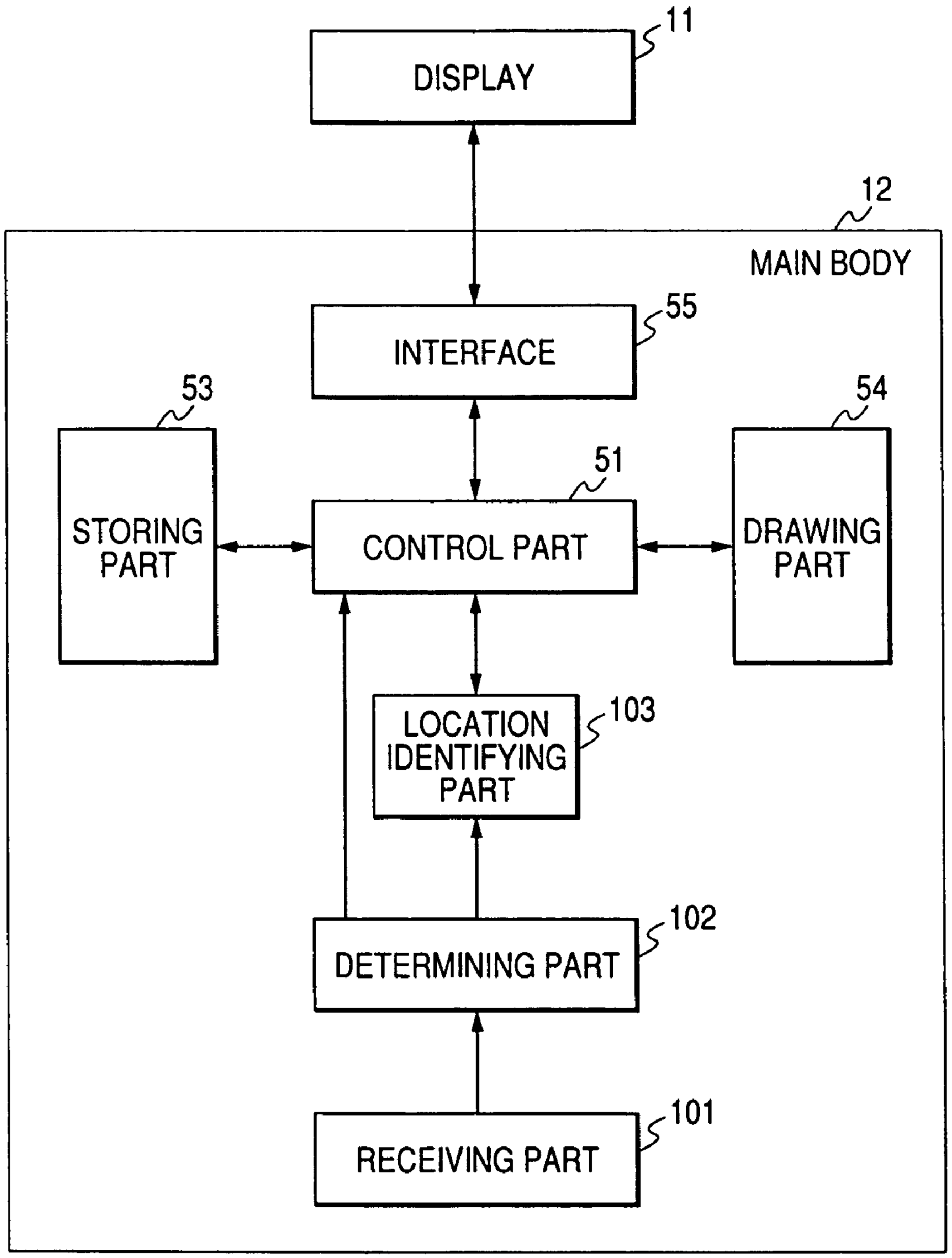
FIG. 22 is a diagram illustrating another exemplary configuration of a main body.

FIG. 22 is a diagram illustrating an exemplary configuration of the main body 12 where the main body 12 is configured integrally with the control unit 14. As compared with the main body 12 shown in FIG. 4, a main body 12 shown in FIG. 22 has the receiving part 101, the determining part 102, and the location identifying part 130 provided in the control unit 14, instead of the input/output part 52. The receiving part 101, the determining part 102, and the location identifying part 130 similarly operate as the parts included in the control unit 14 shown in FIG. 4 do.

In this manner, when the control unit 14 is incorporated in a given device such as the main body 12, the signal from the remote controller 21 is directly sent to the individual devices, and is processed by the received device.

It is possible to provide the control unit 14 on the remote controller 21. FIG. 23 is a diagram illustrating the configuration of the remote controller 21 where the control unit 14 is provided on the remote controller 21.

As compared with the remote controller 21 shown in FIG. 6, a remote controller 21 shown in FIG. 23 is configured in which the location identifying part 103 and the control part 104 provided in the control unit 14 are disposed between the drawing direction determining part 123 and the transmitting part 121. Furthermore, a receiving part 251 is also provided, which is configured in which data received by the receiving part 251 is delivered to the location identifying part 103 and the control part 104.

In this configuration, coordinate data inputted to the touch panel 122 is first delivered to the drawing direction determining part 123. The drawing direction determining part 123 determines from the coordinate data whether the user has drawn a line or spot, further determines the direction when it is a line, and delivers the determined result to the location identifying part 103.

To the location identifying part 103, the coordinate data received by the receiving part 251 is also delivered. The location identifying part 103 determines the selected item from the delivered coordinate data and data relating to the direction, and delivers the determined result to the control part 104. The control part 104 determines the selected item data relating to the delivered items, and determines processing data associated with that item. The receiving part 251 receives the processing data.

The control part 104 executes the process based on the determined processing data. For example, the transmitting part 121 sends data indicating an instruction to turn up the volume to the car audio unit 13.

In this manner, when the control unit 14 is incorporated in the remote controller 21, coordinate data and processing data need to be delivered from devices to be control targets such as the main body 12. Therefore, the remote controller 21 is configured to have the receiving part 251 to allow two-way communications with given devices. Not shown in the drawing, the devices to be operation targets by the remote controller 21 (for example, the main body 12) are configured to have a transmitting part for transmitting coordinate data and processing data.

When the remote controller 21 is thus configured, processing data for controlling a given device is stored in the remote controller 21 itself, and thus the remote controller 21 directly instructs that given device (not through the control unit 14).

In addition, in the embodiment described above, coordinate data and processing data are delivered to the control unit 14 from the main body 12 as necessary, but it is fine to store the data in the control unit 14 beforehand.

A series of the processes described above can be executed by hardware having the individual functions, and also executed by software. When the series of the processes is executed by software, the processes are executed by a computer having programs forming the software incorporated in hardware, or by installing the programs through a recording medium in a general-purpose computer, for example, that can execute various functions of various programs.

Figure 24:
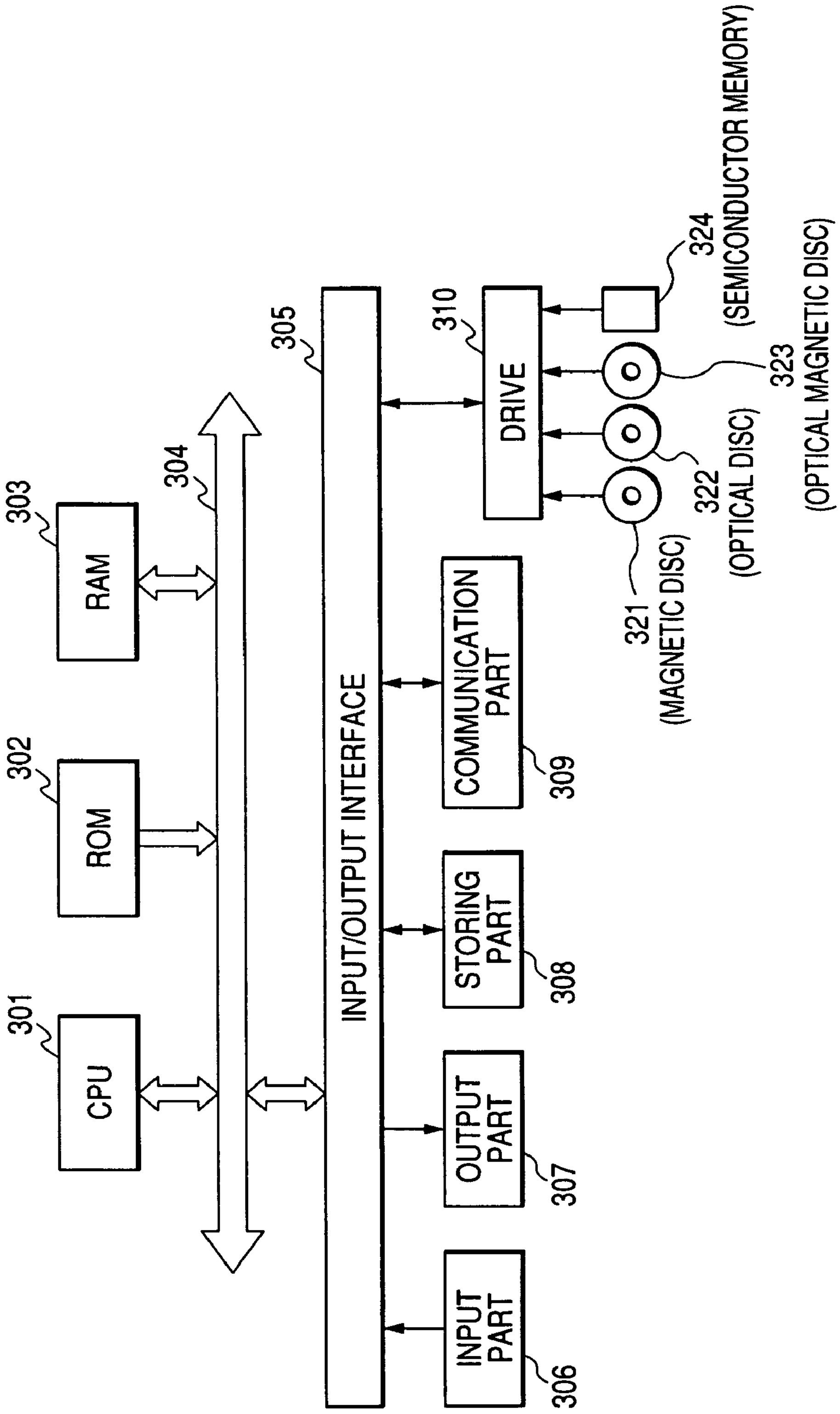
FIG. 24 is a diagram for describing media.

FIG. 24 is a diagram illustrating an exemplary internal configuration of a general-purpose computer. A CPU (Central Processing Unit) 301 of the computer executes various processes in accordance with programs stored in a ROM (Read Only Memory) 302. A RAM (Random Access Memory) 303 stores data and programs required for executing various processes by the CPU 301 properly therein. An input/output interface 305 is connected to an input part 306 configured of a keyboard and a mouse, which outputs signals inputted to the input part 306 to the CPU 301. Furthermore, the input/output interface 305 is also connected to an output part 307 configured of a display and a speaker.

Moreover, the input/output interface 305 is also connected to a storing part 308 configured of a hard drive, and a communication part 309 for sending and receiving data with the other devices through networks such as the Internet. A drive 310 is used when data is read out or written into a recording medium such as a magnetic disk 321, an optical disk 322, an optical magnetic disk 323, and a semiconductor memory 324.

As shown in FIG. 24, separately from the computer, the recording medium is configured of packaged media such as the magnetic disk 321 (including flexible disks), the optical disk 322 (including CD-ROM (Compact Disk-Read Only Memory), and DVD (Digital Versatile Disk)), the optical magnetic disk 323 (including MD (Mini-Disk) (registered trademark)), or the semiconductor memory 324, which are distributed to the user for offering programs and have programs recorded, and also configured of a hard drive including the ROM 302 and the storing part 308 in which programs are stored, the hard drive is offered to the user as incorporated in the computer beforehand.

Furthermore, in the specification, steps of describing programs offered by the medium include processes done in time sequence in the described order, done in parallel, and done individually.

Moreover, in the specification, a system represents the overall system configured of multiple devices.

What is claimed is:

1. An information processing system in a vehicle at least comprising:

an information processing unit;

a remote maneuvering unit for instructing the information processing unit; and a control unit for transmitting an instruction from the remote maneuvering unit to the information processing unit, wherein the remote maneuvering unit includes:

a sensing module for sensing a location touched by a user;

a determining module for determining a figure formed by sequentially connecting the locations sensed by the sensing module, wherein when the determining module determines that the figure is a line, the determining module further determines a direction of the line and the direction results in a determined result;

a detecting module mounted on a rotating member for detecting an angle at which the member rotates;

a correcting module for correcting a direction determined by the determining module in accordance with the angle detected by the detecting module; and a transmitting module for transmitting the determined result by the determining module to the control unit, the control unit includes:

a receiving module for receiving the determined result transmitted by the transmitting module; and an outputting module for determining a process for shifting gears of a transmission of the vehicle, the process being associated with the determined result received by the receiving module and outputting data indicating the process to the information processing unit, and the information processing unit includes:

an executing module for inputting the data outputted by the outputting module and executing the process indicated by the data.

2. An information processing system in a vehicle at least comprising:

an information processing unit; and a remote maneuvering unit for instructing the information processing unit, wherein the remote maneuvering unit includes:

a sensing module for sensing a location touched by a user;

a first determining module for determining a figure formed by sequentially connecting the locations sensed by the sensing module, wherein when the first determining module determines that the figure is a line, the first determining module further determines a direction of the line and the direction results in a determined result;

a detecting module mounted on a rotating member for detecting an angle at which the member rotates;

a correcting module for correcting a direction determined by the determining module in accordance with the angle detected by the detecting module; and a transmitting module for transmitting the determined result by the first determining module to the information processing unit, and the information processing unit includes:

a receiving module for receiving the determined result transmitted by the transmitting module;

a second determining module for determining a process for shifting gears of a transmission of the vehicle, the process being associated with the determined result received by the receiving module; and an executing module for executing the process determined by the second determining module.

3. An information processing system in a vehicle at least comprising:

an information processing unit; and a remote maneuvering unit for instructing the information processing unit, wherein the remote maneuvering unit includes:

a sensing module for sensing a location touched by a user;

a determining module for determining a figure formed by sequentially connecting the locations sensed by the sensing module, wherein when the determining module determines that the figure is a line, the determining module further determines a direction of the line and the direction results in a determined result;

a detecting module mounted on a rotating member for detecting an angle at which the member rotates;

a correcting module for correcting a direction determined by the determining module in accordance with the angle detected by the detecting module; and a transmitting module for further determining a corresponding process for shifting gears of a transmission of the vehicle from the determined result by the determining module, and creating and transmitting a signal indicating the process, and the information processing unit includes:

a receiving module for receiving the signal transmitted by the transmitting module; and an executing module for executing the process indicated by the signal received by the receiving module.

4. A control unit in a vehicle for controlling sending and receiving data between an information processing unit in the vehicle and a remote maneuvering unit for instructing the information processing unit, the control unit comprising:

a receiving module for receiving information about a figure drawn by a user from the remote maneuvering unit;

a determining module for determining a figure represented by the information received by the receiving module, wherein when the determining module determines that the figure is a line, the determining module further determines a direction of the line and the direction results in a determined result;

a detecting module mounted on a rotating member for detecting an angle at which the member rotates;

a correcting module for correcting a direction determined by the determining module in accordance with the angle detected by the detecting module; and an outputting module for determining data indicating a process for shifting gears of a transmission of the vehicle, the process being associated with the figure determined by the determining module and outputting the data to the information processing unit.

5. The control unit according to claim 4 further comprising an acquiring module for acquiring data associated with data indicating the figure and the process from the information processing unit.

6. A control method of a control unit in a vehicle for controlling sending and receiving data between an information processing unit in the vehicle and a remote maneuvering unit mounted on a rotating member of the vehicle for instructing the information processing unit, the control method comprising:

an input controlling step of controlling input of information from the remote maneuvering unit, the information received by a receiving module for receiving information about a figure drawn by a user;

a determining step of determining a figure represented by the information, input of the information controlled at the process of the input controlling step and, when it is determined that the figure is a line, determining a direction of the line;

a detecting step of detecting an angle at which the rotating member rotates;

a correcting step of correcting a direction determined in the determining step in accordance with the angle detected in the detecting step; and an output controlling step of determining data indicating a process for shifting gears of a transmission of the vehicle, the process being associated with the figure determined at the process of the determining step and controlling output of the data to the information processing unit.

7. A program encoded on a computer readable medium that, when executed by a computer, caused the computer to perform a process, wherein the computer controls a control unit in a vehicle for controlling sending and receiving data between an information processing unit in the vehicle and a remote maneuvering unit mounted on a rotating member of the vehicle for instructing the information processing unit, the process including:

an input controlling step of controlling input of information from the remote maneuvering unit, the information received by a receiving module for receiving information about a figure drawn by a user;

a determining step of determining a figure represented by the information, input of the information controlled at the process of the input controlling step and, when it is determined that the figure is a line, determining a direction of the line;

a detecting step of detecting an angle at which the rotating member rotates;

a correcting step of correcting a direction determined in the determining step in accordance with the angle detected in the detecting step; and an output controlling step of determining data indicating a process for shifting gears of the transmission of the vehicle, the process being associated with the figure determined at the process of the determining step and controlling output of the data to the information processing unit.

8. A recording medium recorded with a program readable by a computer for controlling a control unit in a vehicle for controlling sending and receiving data between an information processing unit in the vehicle and a remote maneuvering unit mounted on a rotating member of the vehicle for instructing the information processing unit, the recording medium comprising:

an input controlling step of controlling input of information from the remote maneuvering unit, the information received by a receiving module for receiving information about a figure drawn by a user;

a determining step of determining a figure represented by the information, input of the information controlled at the process of the input controlling step and, when it is determined that the figure is a line, determining a direction of the line;

a detecting step of detecting an angle at which the rotating member rotates;

a correcting step of correcting a direction determined in the determining step in accordance with the angle detected in the detecting step; and an output controlling step of determining data indicating a process for shifting gears of the transmission of the vehicle, the process being associated with the figure determined at the process of the determining step and controlling output of the data to the information processing unit.

* * * * *